United States Patent [19]

Vassiliadis et al.

[11] Patent Number: 4,924,424
[45] Date of Patent: May 8, 1990

[54] PARITY PREDICTION FOR BINARY ADDERS WITH SELECTION

[75] Inventors: Stamatis Vassiliadis, Vestal; Eric M. Schwarz, Endicott; Michael Putrino, Endicott; Brice J. Feal, Endicott, all of N.Y.

[73] Assignee: International Business Machines Corporation, Armonk, N.Y.

[21] Appl. No.: 185,759

[22] Filed: Apr. 25, 1988

[51] Int. Cl.$^5$ .............................................. G06F 11/10
[52] U.S. Cl. .................................... 364/738; 371/49.4
[58] Field of Search ................. 364/738; 371/49, 49.4, 371/49.2, 49.1

[56] References Cited

U.S. PATENT DOCUMENTS

| | | | |
|---|---|---|---|
| 3,649,817 | 3/1972 | Keller | 364/738 |
| 3,911,261 | 10/1975 | Taylor | 235/153 |
| 3,925,647 | 12/1975 | Louie | 235/153 |
| 4,079,457 | 3/1978 | Miller | 364/738 |
| 4,224,680 | 9/1980 | Miura | 364/738 |

OTHER PUBLICATIONS

IBM Technical Disclosure Bulletin, vol. 30, No. 3, Aug. 1987, Minimized Parity Predict Circuit for Incrementation.
IBM Technical Disclosure Bulletin, vol. 23, No. 12, May 1981, Parity Predict of a Sum, R. Kalandra and A. Weinberger.
IBM Technical Disclosure Bulletin, vol. 22, No. 4, Sep. 1979, Parity Prediction for Fast Three-Input Adder, K. E. Olin and A. Weinberger.
IBM Technical Report, TR 01.1200, Aug. 26, 1969, Concurrent Error Detection for Group Look-Ahead Binary Adders, G. G. Langdon, Jr., and C. K. Tang.

Primary Examiner—Jerry Smith
Assistant Examiner—Robert W. Beausoliel
Attorney, Agent, or Firm—Baker, Maxham, Jester & Meador

[57] ABSTRACT

An apparatus for predicting parity of a result produced by selection of the most or least significant thirty-two bits produced by a thirty-four bit adder, the parity being predicted concurrently with and independently of the result. Parity for byte Si of the selected result is derived by circuitry implementing the relationship:

$$Pi = yP(m, n-1) \lor P(n, m+7) \lor y'P(m+8, n+7)$$

in which Pi is the parity bit for Si, y is the positive sense of a signal indicating selection, of the most significant thirty-two result bits, y' is the complement of y and indicates selection of the least significant thirty-two result bits, $P(M, n-1)$ is parity over the two most significant result bits in the portion of the result covering result bits m through n+7, $P(m+8, n+7)$ is parity of the two least significant bits of the result portion, $P(n, m+7)$ is parity over the central bits of the portion, i is an integer and $0 \leq i \leq 3$, $m = 8i$, and $n = m+2$.

21 Claims, 13 Drawing Sheets

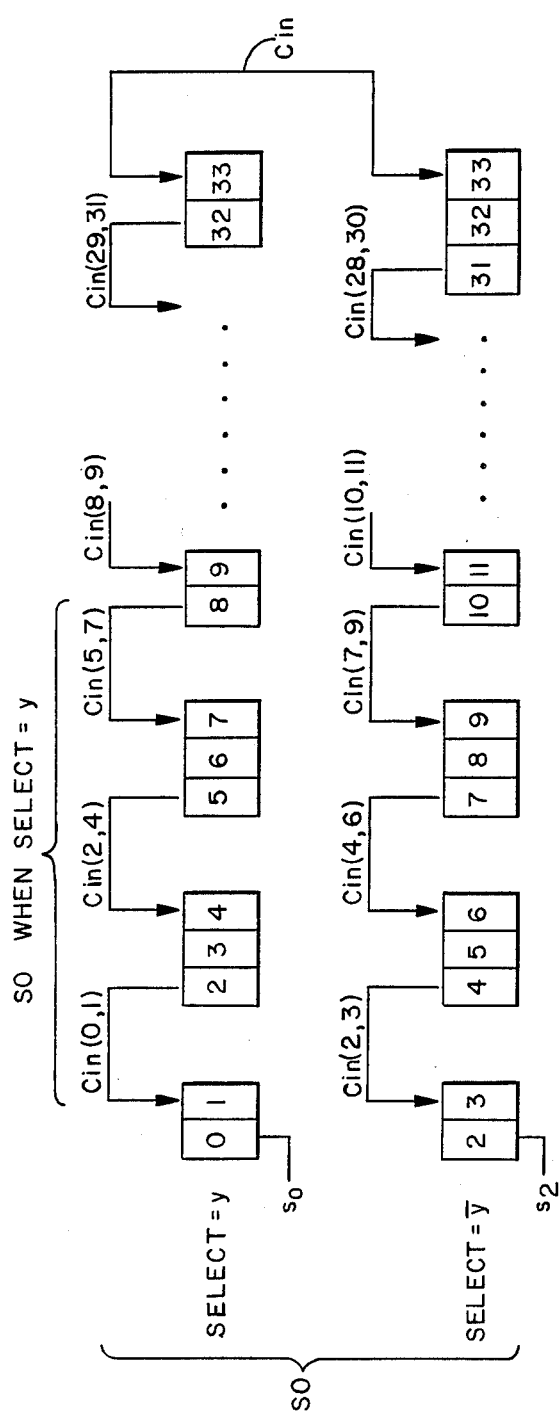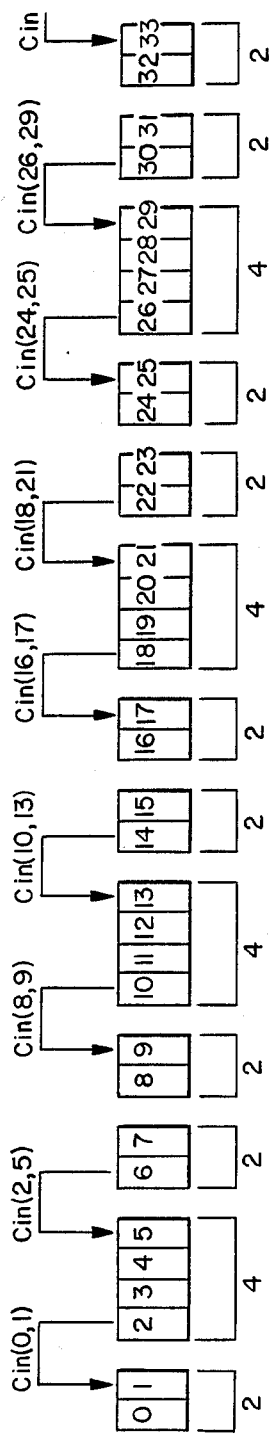
FIG. 5
FIG. 6

PARITY PREDICTION FOR BINARY ADDERS WITH SELECTION

BACKGROUND OF THE INVENTION

1. Field of the Invention

This invention relates generally to the area of error detection for digital computer systems and more specifically to parity prediction logic for high-speed binary adders with shifting outputs.

2. Description of the Prior Art

A binary adder is a vital component of electronic digital computer systems. The speed and reliability of the binary adder are, therefore, major concerns in computer system design. It is well known that a carry look-ahead adder generates the result of an operation on two operands faster than that of a ripple carry adder. It is also known that a carry look-ahead adder can be implemented in many different ways. This invention is not concerned with design of a high-speed binary adder, but rather relates to the design of checking logic for error detection in a high speed adder. For an explanation of the operation of carry-look-ahead adders, see Langdon and Tang, "Concurrent Error Detection for Group-Look Ahead Adders," IBM Tech. Rep., TR 01.1200, Aug. 26, 1969.

In the past, computers were used largely in an off-time, batch-processing mode and the consequences of undetected hardware malfunctions were relatively minor. Today, digital computers, even main-frame computers, are utilized in on-line information processing, data entry and retrieval, and real-time control of processes. Incorrect computer operation in any of these applications must be detected as soon as possible. At the same time, the increased size and complexity of digital computers have made it more and more difficult to ensure correct machine operation.

In modern computer systems, operational reliability is supported by built-in error detection. A commonly used method of error detection is parity checking. Conventionally, in a parity checking procedure, a "parity" bit is generated in response to the number of "ones" in an arbitrary group of bits. Typically, for a byte, comprising eight bits of data, the parity bit will take on a digital value (1 or 0) which will make the sum of the ones in the combined group of nine bits odd, if odd parity applies, or even, if even parity.

In modern computer architecture, data are transferred or exchanged between architectural units in a standard format. For example, data is transferred in the form of sequences in multi-byte "words" in many contemporary architectures. It is the case that a parity bit accompanies each byte being transferred so that transfer of a four-byte word involves thirty-six bits.

When words are operated upon by computer elements, as, for example, in an adder, the parity bits are separated and separately treated. When two words are combined in an adder to produce a result word, parity bits must be generated for each byte of the result. Formerly, parity bits for the result word were generated when the word was available from the adder. In this case, the parity bits were generated by operating on the result. It is now standard practice to increase the speed of conventional adder operations by "predicting" parity bits for the results in a parity predict operation performed concurrently with the add operation. In such schemes, predicted parity is generated and then compared to the actual parity of the result word. If disparity is detected, an error signal generated by the comparison causes the adder to repeat its operation. If a second error is detected, it is assumed that the adder has malfunctioned.

Parity prediction schemes are shown in Louie, U.S. Pat. No. 3,925,647 and Kalandra et al, IBM TDB Vol. 23, No. 12 (5/81). These schemes include parity prediction circuits which are very complex and may cause more delay then the adder itself. Elimination of delay is important, particularly in pipelined processing systems. The parity prediction delays cause the system designer to be faced with a trade-off: allow the system to operate at the speed of the adder and provide for means to unravel the system errors caused by errors in the adder, or slow the system to allow for the delays of the parity prediction circuit.

Another parity prediction scheme is shown in Taylor, U.S. Pat. No. 3,911,261. However, the scheme of Taylor only provides a "best guess" predicted parity. The increased error and delays caused by inaccurate "guesses" are unacceptable in modern computing systems.

Parity prediction is further complicated by architectures which use a "shifting adder." A shifting adder provides a result which includes more bits than are actually used as the output result signal. A subset of the actual result signal is selected in response to a selection signal. The selection signal is generated from the instruction being executed. For example, an adder may provide an actual result word having thirty-four bits. A selection signal determines whether the thirty-two most significant bits or the thirty-two least significant bits are provided on the output port. This allows for the increased precision of a thirty-four bit add operation with the use of the more common thirty-two bit bus architecture, but complicates the task of parity prediction. Because the parity is to be provided for the thirty-two bit word on the adder output port, a parity prediction scheme must take into account that an entirely different parity bit is needed for each possible output word. This requires parity prediction circuits for each possible shift. The result, for the example given, is to double the required parity prediction circuitry. A more efficient and economical technique of parity prediction is provided by the described embodiments of this invention.

SUMMARY

The described embodiments of the invention provide parity prediction in a shifting adder. In certain adder designs, the instruction being performed may require that certain of the most significant or least significant bits of a result be selected; for example, the thirty-two most or least significant of thirty four bits may be selected. The selection determines the parity of the bits selected as the sum. By dividing the equations to predict parity into equations for predicting the parity of portions of the sum, parity may be predicted with a minimum of delay caused by the selection. The parity equations are factored to provide a set of terms that pertain only to one selection, a set of terms pertaining only to the other, and a set of terms independent of selection. The described embodiments are designed to use one parity bit for each eight bit byte convention. With the provided output signal having two less bits than the actual sum and the most significant versus least significant selection option, each byte of the provided output signal will always include six bits from the actual sum and may include the two adjacent higher magnitude bits or the two adjacent lower magnitude bits. The parities of these three portions are determined and are combined in response to the selection signal to determine the parity of the provided byte. Because the selection signal may be conditional after the operands are provided, the selection signal is included into the parity prediction logic at the last possible stage to prevent the selection signal delay from delaying the parity prediction output signal. This structure avoids unnecessary delays and duplication of parity prediction circuitry.

BRIEF DESCRIPTION OF THE DRAWINGS

FIGS. 5 and 6 illustrate how result bits are grouped for the purpose of determining how carries are accounted for in the practice of the invention.

DETAILED DESCRIPTION OF THE PREFERRED EMBODIMENT

Figure 1:
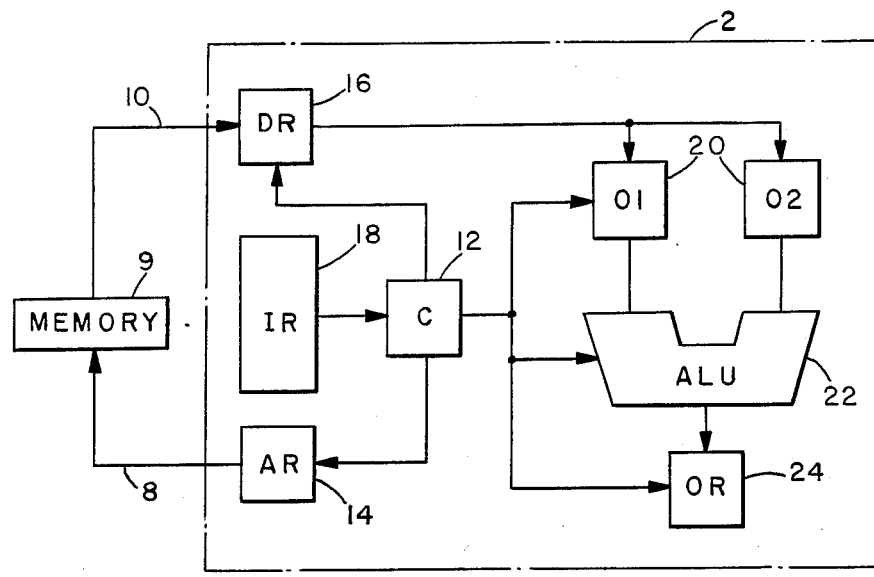
FIG. 1 is a diagram illustrating the central processing unit of a computer.

FIG. 1 is a schematic diagram showing the details of the structure of a computer central processing unit (CPU)2. The CPU2 includes a control unit 12 for providing addresses to an address register 14, which are passed on an address bus 8 to a memory 9. In response to addresses provided to memory 9, program instructions are loaded by way of a data bus 10 and data register 16 into an instruction register (IR) 18. The control unit 12 then reads the instructions loaded into the IR 18 in response to instructions decoded by the control unit 12, data is retrieved from storage in the memory 9. The data retrieved from the memory 9 can include a pair of operands provided to operand registers (01 and 02), 20, to be operated upon by an arithmetic logic unit (ALU) 22. The output resulting from ALU 22 operations is provided to an output register (OR) 24. The output of the ALU 22 may be stored in the memory 9 or provided to another internal register CPU.

Figure 2:
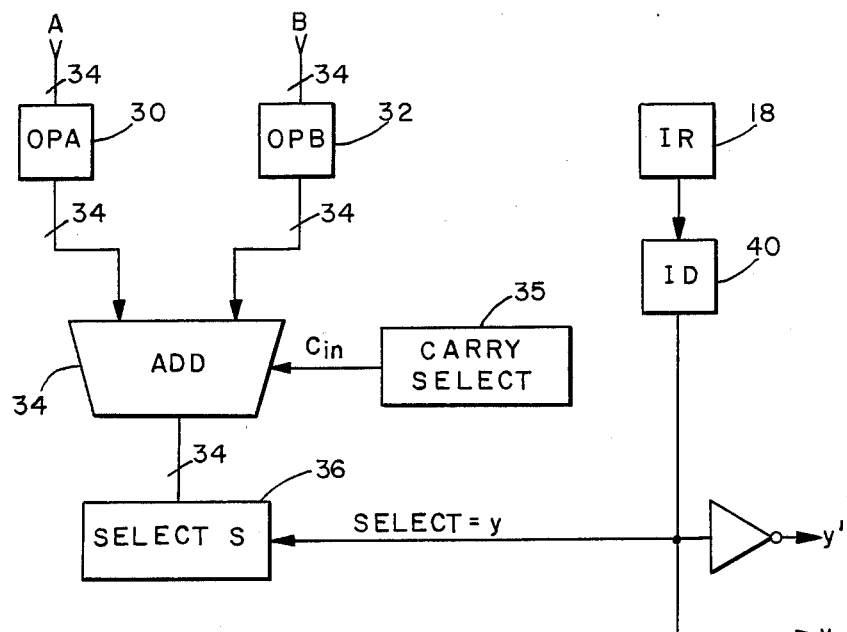
FIG. 2 is a diagram illustrating the structure and operation of a shifting adder in the CPU illustrated in FIG. 1.

ALU 22 may comprise a shifting adder, such as is illustrated in FIG. 2. In FIG. 2, the shifting adder circuit includes operand registers 30 and 32, an adder (ADD) 34, a carry unit 35, and a select unit 36. The output of the adder 34 is operated upon by the select circuit 36 under control of a combination of the instruction register 18 and an instruction decoder 40 (I DECODE), contained in the control unit 12. In operation, a pair of operands, each consisting of thirty-four bits of data ordered from a most significant bit (MSB) to a least significant bit (LSB), are provided to the operand registers 30 and 32. The operand in the register 30 is referred to as operand A (OP A), while that in 32 is referred to as operand B (OP B). A carry-in bit, $C_{in}$, is conditioned and provided by the carry unit 35. A carry unit 35 is conventional and can be understood by reference to U.S. Pat. No. 3,986,015, incorporated by reference. The carry bit is set to a value of 0 or 1, depending upon the current instruction and the previous result.

The 34-bit operands are provided to the adder 34 which is a conventional 34-bit adder. The adder 34 combines the operands and the carry-in bit to produce a 34-bit result, which is fed to the select circuit 36. The 34-bit result includes bits numbered from 0–33, with bit 0 being the most significant bit (MSB) and bit 33 the least (LSB). The select circuit is a conventional gated circuit, conditioned by a SELECT signal, to provide either the most significant or least significant 32 bits of the result. In this regard, the most significant 32 bits are bits 0–31, according to the significance convention employed herein, while the least significant 32 bits are bits 2–33.

The SELECT signal is a binary signal produced by the instruction decoder 40 in response to an appropriate instruction in the instruction register 18. Depending upon the instruction, the decoder conditions the SELECT bit to assume one of two conventional digital values. Thus, according to the value of the SELECT signal, the selected result provided by the SELECT circuit 36 will consist of a 32-bit result comprising the 32 most or 32 least significant bits produced by the adder 34.

Figure 3:
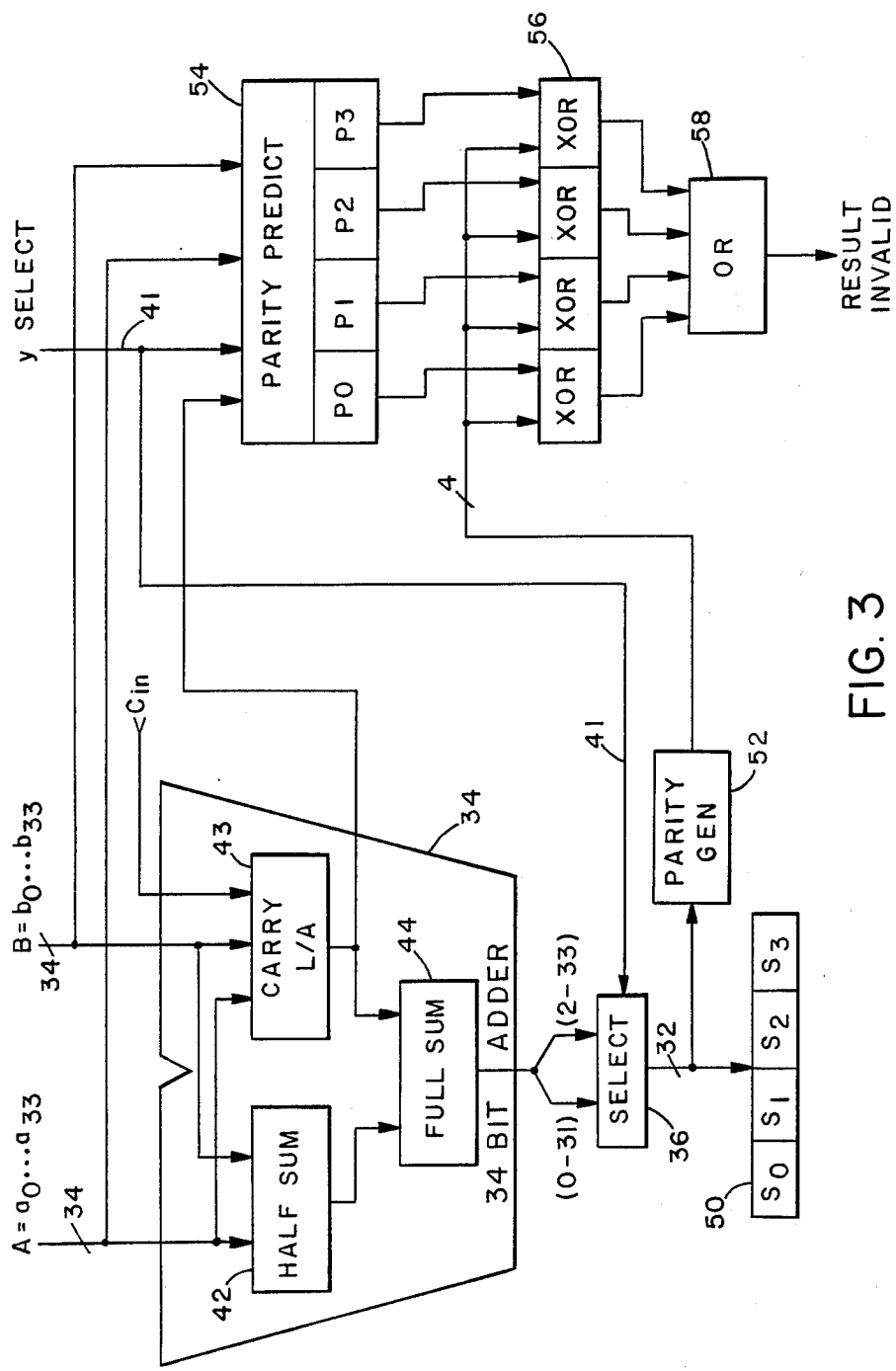
FIG. 3 is a diagram illustrating the structure of a parity prediction circuit for use in parallel with the shifting adder illustrated in FIG. 2.

Necessary to the understanding of the invention is reference first to FIG. 3 where the adder 34 includes conventional circuits 42–44 for generating half sums (42), carry look-aheads (43), and, from the half sums and carry look-aheads, full sums (44). The circuits 42–44 can have any of a number of well-known structures. The adder 34 operates on the A and B operands, each consisting of 34 bits, with the bits of the A operand signified by A0 ... A33, from most to least significance, and the B operand from B0 ... B33 in order of descending significance. The selector 36 operates under the control of the SELECT signal, denoted hereinafter by y. In the description to follow, y is a binary signal, whose value is indicated by standard complementary notation. Thus, if positive, the notation is y, if negative, Y'. As stated above, the most or least significant 32 bits produced by the adder 34 are selected and provided as the sum S. The sum 50 S consists of 4 bytes S0, S1, S2, and S3 from most to least significant. The bits of each byte are subscripted by significance, thus the most significant byte S0 of the sum 50 consists of bits s0–s7. When produced, the selected sum 50 is provided to a conventional parity generator 52 which generates a parity bit for each of the bytes S0–S3. The four parity bits produced by the generator 52 are compared with four parity bits generated by the parity prediction circuit of the invention 54.

The parity prediction circuit 54 produces predicted parity bits Pi, with i=0, 1, 2, or 3. In this notation, the subscript i denotes the parity bit produced by the parity predict circuit 54 for the corresponding sum byte. Thus, predicted parity bit P0 is the bit predicted for sum byte S0. Each predicted parity bit is compared with the corresponding parity bit produced by the parity generator 52 in a respective one of four exclusive - OR (XOR) gates 56. Thus, the predicted parity bit P0 is provided, together with the parity bit generated by the generator 52 for sum bite S0 to the left-hand most XOR gate 56. The outputs of the XOR gates 56 are connected to the inputs of the OR gate 58 to produce a RESULT INVALID indication in the event that any one of the predicted parity bits is not equal to the corresponding parity bit produced by the generator 52.

Since the 32-bit sum 50 can consist of sum bits S0–S31 or S2–S33, the selection may completely alter the parity of the four bites in the 32-bit sum 50. This problem is illustrated graphically in FIG. 4.

Figure 4:
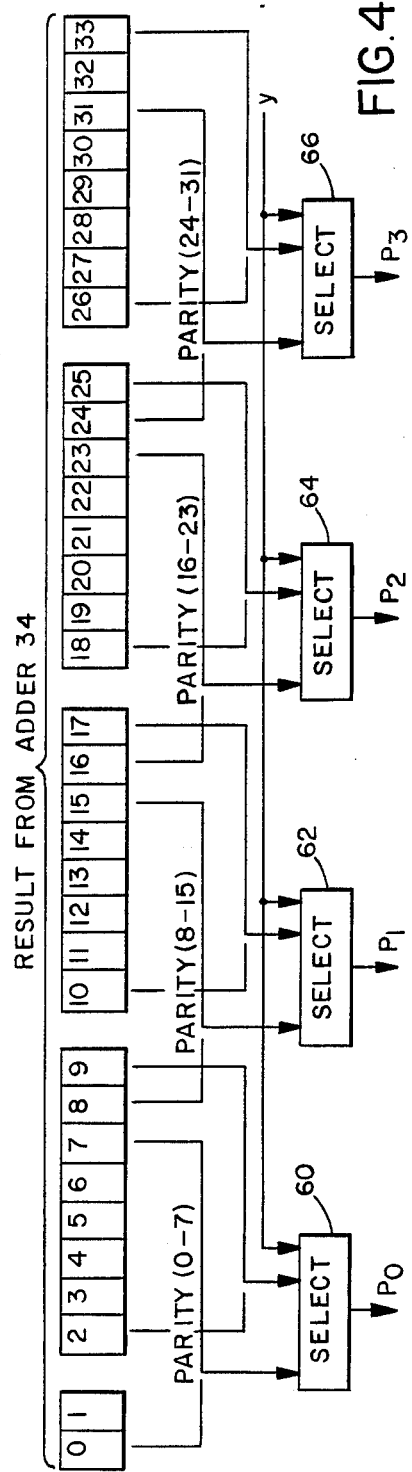
FIG. 4 is a diagram illustrating subdivision of a 34 bit result word produced by the adder illustrated in FIG. 2 for the practice of the invention.

FIG. 4 illustrates, conceptually, how the predicted parity applies to the result. In FIG. 4, if the most significant 32 sum bits are selected, then the predicted parity bits will indicate parity over bits s0–s7, s8–s15, s16–s23, and s24–s31. If the least significant 32 bits are chosen, the parity bits will indicate parity over s2–s9, s10–s17, s18–s25, and s26–s33. Conceptually, if each set of four predicted parity bits is generated simultaneously, and the parity bits for the sum bytes of corresponding significance are fed to respective ones of selection circuits 60, 62, 64, and 66, the SELECT signal can be used to select the correct set of parity bits for the selected sum. Thus, if the positive sense of the SELECT signal (y) is used to signify selection of the most significant sum bits s0–s31, while the opposite sense (Y') selects sum bits S2–S33, the selection circuit 60 will choose the predicted parity bit for sum bits s0–s7, for y and the predicted parity bit for s2–s9 for y'. The predicted parity bit selected by circuit 60 is provided to the XOR gates 56 as P0, parity bit for byte S0 of the selected sum 50. Similarly, selection circuit 62, 64, and 66 select the predicted parity bits P1, P2, and P3 for bytes S1, S2, and S3 of the selected sum 50. It will be evident to those skilled in the art that the selection of result bits to provide the sum 50 may completely alter the parity of each of the four bytes in the 32 bit sum.

With reference now to Appendix A, a table of notations and equivalences, the concept of predicted parity bit selection illustrated in FIG. 4 is derived analytically. In Appendix A, entries A.1.5–A.1.9 are well-known terms in the art. Reference is given, for example, to the above-referenced IBM Technical Report authored by Langdon, Jr. et al.

Formally, if y (the value of the SELECT signal) is a variable that denotes the selection of sum bits s0–s31, then by mutual exclusiveness, y' (the complement of y') denotes the selection of sum bits s2–s33. Let $P(a,b)$ be the parity of the sum from bit a to bit b; then, the parity, $P_i$, of the sum byte, $S_i$, is:

$$yP(m,m+7) + y'P(n,n+7) = Pi \quad (1)$$

such that:
i belongs to N, $m = 8i$, $n = m + 2$, and $0 \leq i \leq 3$.
and by using equivalence A.2.2 from Appendix A.

$$yP(m,m+7) \lor y'P(n,n+7) = Pi \quad (2)$$

Given that:

$$P(m,m+7) = P(m,n-1) \lor P(n,m+7)$$

and:

$$P(n,n+7) = P(n,m+7) \lor P(m+8,n+7)$$

then:

$$(2) \rightarrow \quad Pi = y(P(m,n-1) \lor P(n,m+7)) \lor y'(P(n,m+7) \lor P(m+8, n+7))$$
$$= yP(m,n-1) \lor yP(n,m+7) \lor y'P(n,m+7) \lor$$

-continued
$$y'P(m+8,n+7)$$
$$= yP(m,n-1) \lor P(n,m+7)(y \lor y') \lor$$
$$y'P(m+8,n+7)$$
$$(3) \quad Pi = yP(m,n-1) \lor P(n,m+7) \lor y'P(m+8,n+7)$$

There are three parity groups in equation (3) which are exclusive-ORed; the first is ANDed with y, the second is independent of the selection, and the third is ANDed with selection y'. In implementing equation (3), the quantities exclusive-ORed must be generated.

It is generally known that in parity prediction for sums, an important factor is the provision of a carry bit. Parity prediction schemes use either both input operands and carry bits from the adder itself, or duplicate the carries by generating them separately. The sum is formed using the carry bit into either the "byte" or "nibble", thus the carry bit must be taken into account in predicting the parity of the bytes.

In this regard, carry into the "byte" signifies the carry that is generated between groups of bits during add operations conducted to produce a sum. See the Langdon et al reference at page 2. In this invention, a "byte" carry refers to the carry brought into the operand bit operations which produce a respective byte of the sum, where a byte, as above, encompasses eight consecutive sum bits. A "nibble" carry is the carry brought into a 4-bit grouping during adder operations.

PARITY PREDICTION USING THE BYTE CARRIES

A machine is now described for predicting the parity of sum bytes. This machine is based upon partitioning of sum bits into predetermined routes within each bit. The parity prediction machine will predict a correct parity bit for the byte selected by the state of the SELECT signal. In the description which follows, and in other examples, subsequently described, the half-adder functions Ti, Gi, Hi, Tx−i, are as disclosed in the previously cited Langdon et al reference.

In deriving the parity prediction equations using the carry bit into byte, the machine is partitioned into groups of 3 and 2 bits of groups as shown in FIG. 5. In FIG. 5, with the positive sense of the SELECT signal, the partitioning proceeds from the most to the least significant bits of S0, with 3 carries within, and 1 carry into the byte. The first internal carry, for example, Cin (0, 1) is carry generated from sum bits s2–s4 into sum bits s0 and s1. Carry into the byte is Cin (5, 7) from sum bits s8 and s9 into sum bits s5–s7. It should be noted that the carryin Cin to the adder is always provided to generate the least significant byte or nibble of the 34 bit result whether SELECT=y or y'. Now, using the partitioned groups, the carry into the byte, and equation (3) the parity P0 for sum byte S0 can be determined by the following equation:

(B.24) P0 = (yT1 + y'H8) V (yH0 + y'T9) V
(yH1'(G(2,9) + T(2,9)Cin) + y'H9'Cin) V
H2 V T4 V H5 V
(G3 + T3G4') V (H4' + H3)(G(5,9) +
(T5,9)Cin) V (G6 + T6G7') V
((T7' + G7'H6')(G(8,9) + T(8,9)Cin) +
T7(G(8,9) + T(8,9)Cin)')

The derivation for this equation is shown in Appendix B. Similarly, the same substitution can be used on the formulas in Appendix C. See, for example, P0 according to Equation C.21. By using the same procedure, the parity bits P1, P2, and P3 of the remaining bytes can be derived.

PARITY PREDICTION USING THE NIBBLE CARRIES

In using the nibble carries instead of the byte carries for parity predict, the adder may be partitioned in groups of 4 and 2 bits as shown in FIG. 6. In Appendix D, deriving in the same manner as B.24 results in:

$$
\begin{aligned}
(D.4)\ P0 = &\ (yT1 + y'H8)\ V\ (yH0 + y'T9)\ V \\
&\ (yH1'Cin(O,1) + y'H9'Cin(8,9))\ V\ H2\ V \\
&\ T3\ V\ T4\ V\ T5\ V \\
&\ (H3G4 + H3'H4G5)\ V\ H6\ V\ T7\ V \\
&\ (H5'Cin(2,5) + H3'H4Cin(2,5))\ V \\
&\ H7'Cin(6,7)
\end{aligned}
$$

In Appendix E, the other formulas that can be derived in this manner are shown. Also, the carries can be substituted for in a similar manner as shown with regard to the last section. By the same procedure, the parity for the remaining bytes can be derived.

INDUSTRIAL APPLICATION

Several equations can be derived for parity prediction of 34-bit addition with selection, as in Appendix C and Appendix E, and these equations can be implemented similarly. Equation B.24 is chosen to demonstrate how to implement these formulas and how they compare to parity prediction for a 32-bit adder.

$$
\begin{aligned}
(B.24)\ P0 = &\ (yT1 + y'H8)\ V\ (yH0 + y'T9)\ V \\
&\ (yH1'(G(2,9) + T(2,9)Cin) + Y'H9'Cin)\ V \\
&\ H2\ V\ T4\ V\ H5\ V \\
&\ (G3 + T3G4')\ V\ (H4' + H3)(G(5,9) + \\
&\ T(5,9)Cin)\ V \\
&\ (G6 + T6G7')\ V \\
&\ ((T7' + G7'H6')(G(8,9) + T(8,9)Cin) + \\
&\ T7(G(8,9) + T(8,9)Cin)')
\end{aligned}
$$

The inputs to the parity predict circuitry are considered to be both the prime and complements of the adder inputs and the carries generated by the adder carry look-ahead 34 to the byte or nibble. In general, the carries in an implementation are delayed several levels from the adder inputs. Therefore, they need not be used until the last level of parity prediction. Thus, for P0, the carry terms are predicted on as is shown in equations (4) and (5).

$$
\begin{aligned}
&\underline{\text{Cin} = 1} \\
(4)\ P0 = &\ H2\ V\ T4\ V\ (G3 + T3G4')\ V\ (H4' + H3) \\
&\ (G(5,9) + T(5,9))\ V \\
&\ H5\ V\ (G6 + T6G7')\ V \\
&\ ((T7' + G7'H6')(G(8,9) + T(8,9)) + \\
&\ T7(G(8,9) + T(8,9))')\ V \\
&\ (yT1 + y'H8)\ V\ (yH0 + y'T9)\ V \\
&\ (yH1'(G(2,9) + T(2,9)) + y'H9') \\
&\underline{\text{Cin} = 0} \\
(5)\ P0 = &\ H2\ V\ T4\ V\ (G3 + T3G4')\ V\ (H4' + H3) \\
&\ G(5,9)\ V \\
&\ H5\ V\ (G6 + T6G7')\ V \\
&\ ((T7' + G7'H6')G(8,9) + T7G(8,9)')\ V \\
&\ (yT1 + y'H8)\ V\ (yH0 + y'T9)\ V \\
&\ yH1'G(2,9)
\end{aligned}
$$

Equations 4 and 5 require 6 levels of logic for the actual implementation in a CMOS technology. The details on the logic arrays used, their associated delays and cell counts, and the terms that are calculated on each level are found in Appendix F. Appendix F also contains the terms that can be calculated on each level for the 32-bit adder parity predict derived in Langdon and Tang. The 32-bit adder parity predict takes 6 levels of logic and results in a worst case delay of 16.9 ns and 1000 cells, whereas the schema for a 34-bit adder parity predict results in a worst case delay of 17.9 ns and approximately 1100 cells. The 34-bit adder implemented in the same technology is known to have a worst case delay of 18.1 ns with 2700 cells.

From Appendix F, several conclusions will be evident to those skilled in the art. First, parity prediction does not depend on the parity of the inputs, but entirely on the addend(A), augend(B), carry transmit(T), carry generates(G), halfsums(H), and the carries. Equation (3), which produces the parity, contains three "partial" parity portions, two that depend on the choice of the final result and one that is independent of the choice. The final formulation that is derived from the choice of the grouping of the adder inputs results in an expression that contains a minimal amount of exclusive OR's and their associated logic, not causing a prohibitive delay as is proven by Appendix F. The parity path is a non-critical path for the add function, but is obtained at the expense of additional hardware. However, the amount of hardware used to produce the parity for a 34-bit adder with selection on the final results is of the same order of magnitude as that of the parity for the 32-bit adder. Moreover, while there is a small difference in actual delay time (due to the varying book delays), the number of logic levels involved for parity prediction is equal for both 32-bit adders and 34-bit adders with selection on the result.

Figure 7:
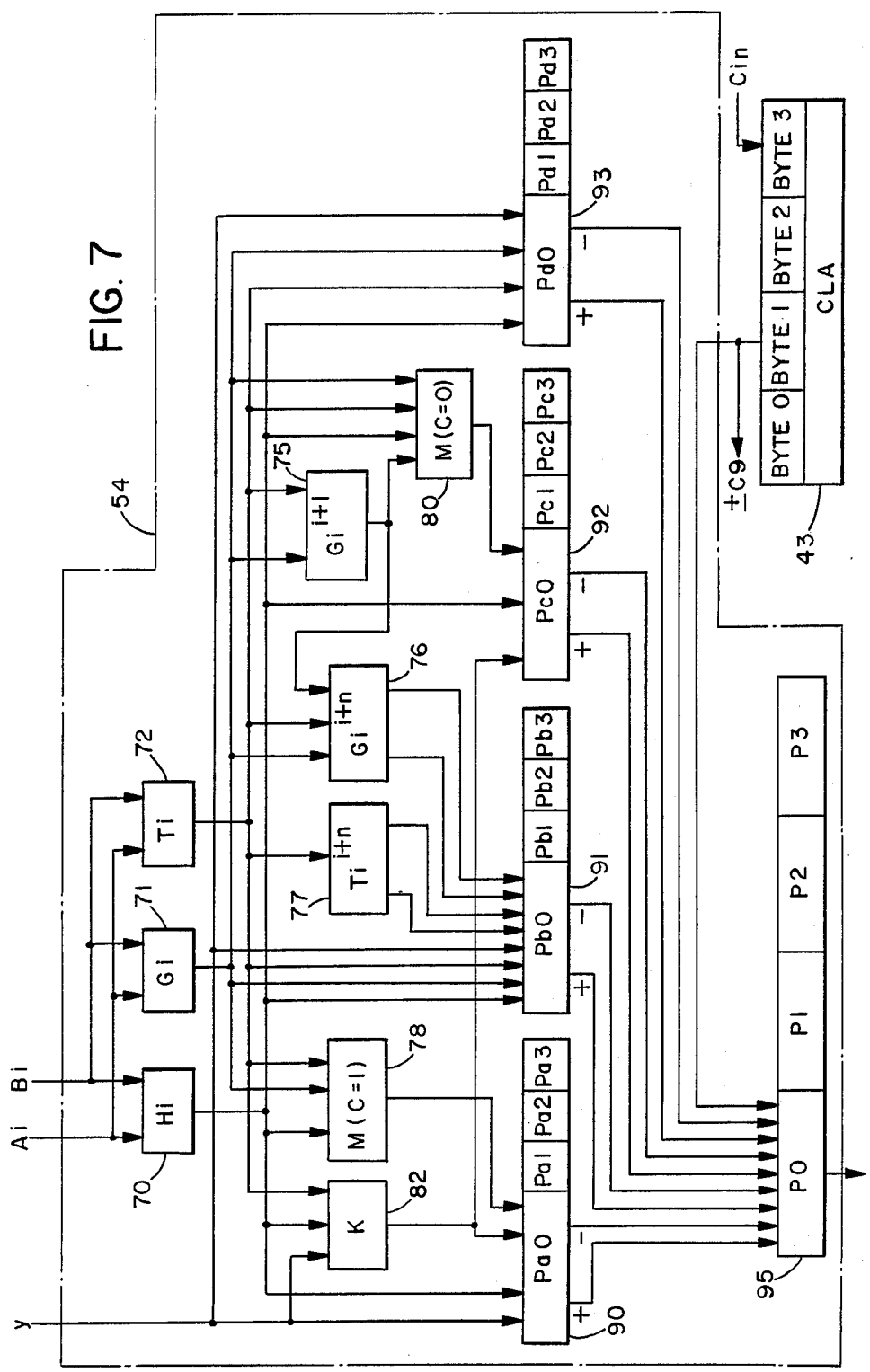
FIGS. 7–16 are logic diagrams illustrating a combinatorial logic circuit for an embodiment of the invention.

Appendix G develops, from equation (1) a set of terms which permit the embodiment of the invention in the tangible structure illustrated in FIGS. 7-16. FIG. 7 shows, in greater detail, the parity prediction circuit 54 of FIG. 3 as defined by equations of Appendix G. In FIG. 7, the inputs to the parity prediction circuit 54 are the SELECT signal and the operands A and B. The circuit of FIG. 7 specifically details how the first parity bit P0 is derived from the inputs according to the equation of Appendix G. It is understood that corresponding circuitry for the parity bits P1, P2, and P3, under an odd parity regime can be easily derived from the teaching regarding the bit P0.

Figure 8:
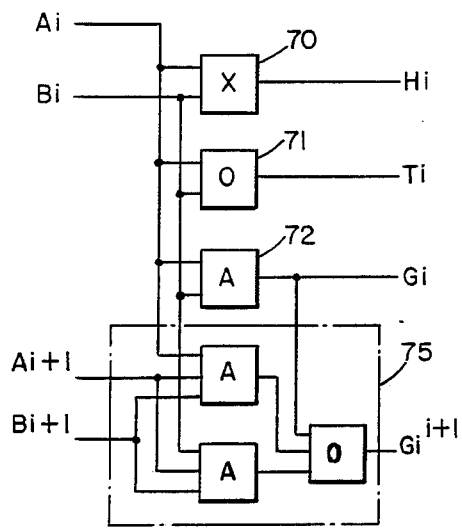

The parity predict circuit of FIG. 7 is shown in greater detail in FIGS. 8-16, wherein invertors are designated by N, and gates by A, OR gates by O, and exclusive-OR gates by X. In the parity predict circuit are three half-sum generators 70-72 for producing, respectively, the half-sum bit Hi, the carry generate bit Gi, and the carry transmit bit Ti in response to operand bits Ai and Bi. These circuits are detailed in FIG. 8, which illustrates the combinatorial circuit equivalent of the Hi, Gi and Ti equivalences defined in Appendix A. In addition, intermediate term circuits 75-77 receive specific carry generate and carry transmit terms from the corresponding circuits 71 and 72, in response to which they generate group carry generate and transmit signals. The group carry generate circuit 75 is generalized to G(i,i+1), the equivalent of which is illustrated in FIG. 8 by a conventional arrangement of one OR gate (0) and two AND gates (A). A circuit 76 for producing a group carry generator G(i,i+n) is indicated by reference numeral 76 in FIG. 7 and illustrated in more detail by a conventional arrangement of AND and or OR gates illustrated in FIG. 9. Similarly, a group carry transmit circuit 77 for producing the group carry transmit $T(i,i+n)$ is indicated by reference numeral 77 in FIG. 7 and illustrated, conventionally, in greater detail by an arrangement of AND gates in FIG. 9.

Figure 11:
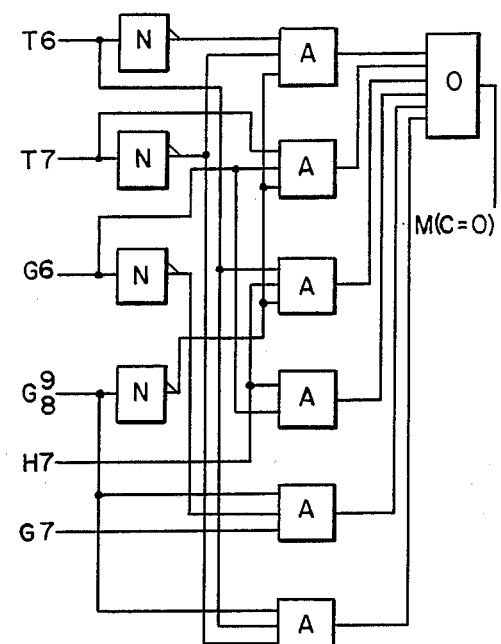
Figure 10:
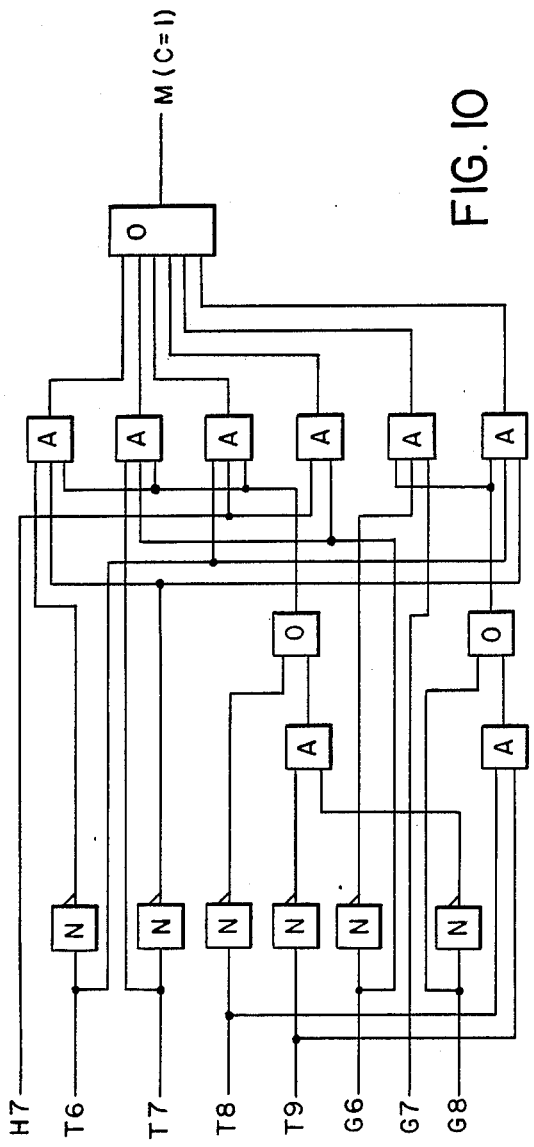

The term $M(C=1)$ defined by equation (G.5.a) is represented by circuit block 78 in FIG. 7, and illustrated in more detail in FIG. 10 by an arrangement of inverters (N), AND gates, and OR gates which are interconnected conventionally to implement equation (G.5.a). A circuit block 80 in FIG. 7 develops a term $M(C=0)$ defined by equation (G.7.a). This circuit block is illustrated in greater detail in FIG. 11. Those skilled in the art will recognize that FIG. 11 is a combination of inverters, AND gates, and an OR gate conventionally interconnected to implement equation (G.7.a).

Figure 12:
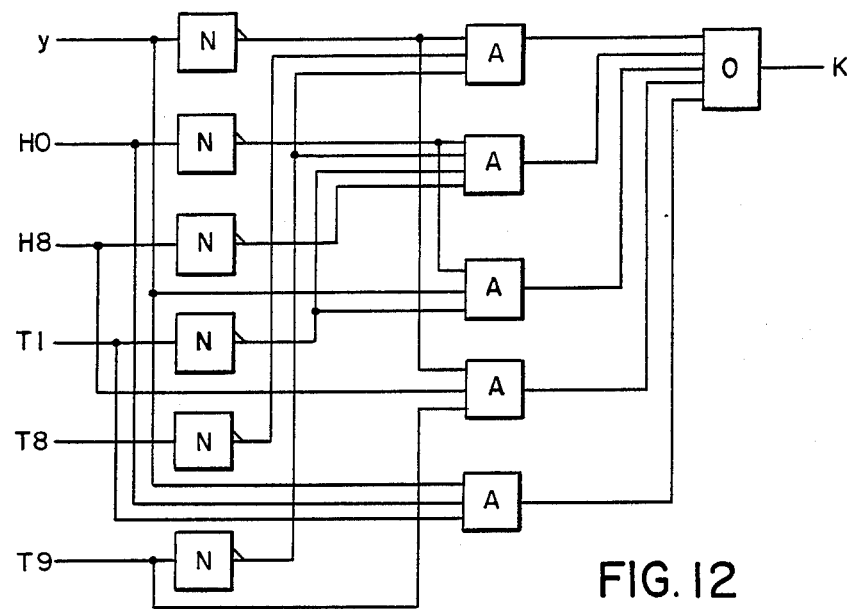
Figure 9:
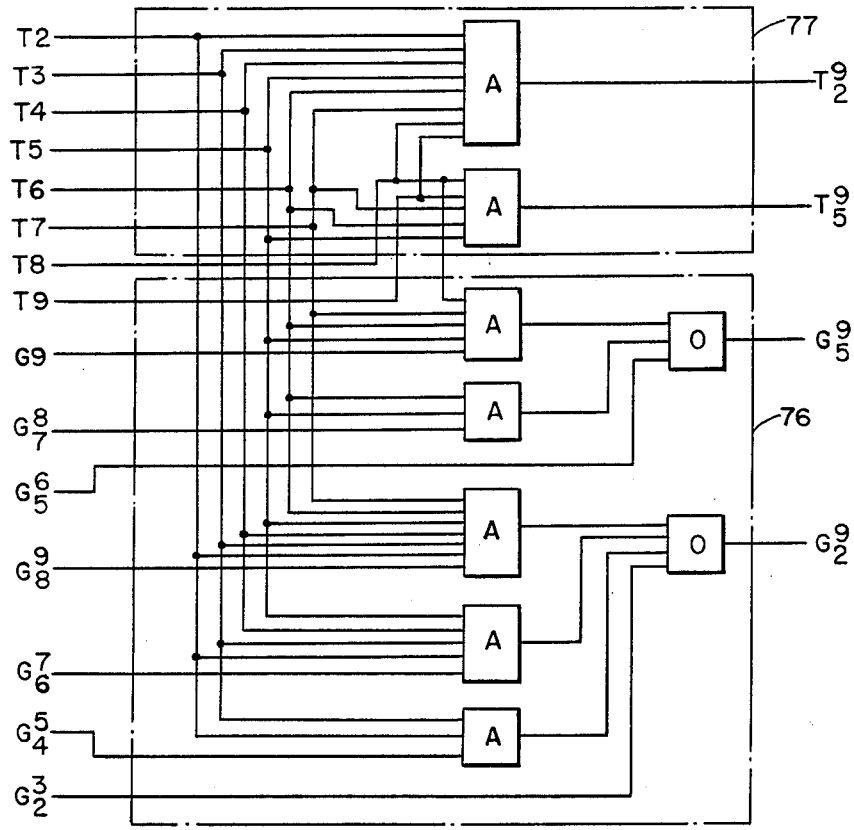

Finally, an intermediate term K is generated by circuit block 82, which is illustrated in greater detail in FIG. 12. The combinatorial logic circuit of FIG. 12 includes inverters, AND gates, and an OR gate, which structurally embody the relationship of equation (G.3.a).

As observed in Appendix G, and particularly with reference to equation (G.10), each parity byte can be implemented in a combinatorial circuit having two parallel branches, each corresponding to a respective state of the carry-in to the corresponding sum byte. Corresponding equations can be derived using the methodology of Appendix G for the parity bytes P1, P2, and P3. As will be evident, the carry in to the equation for bit P3 will be the carry in Cin produced by the carry select circuit 35 of FIG. 2.

Figure 15:
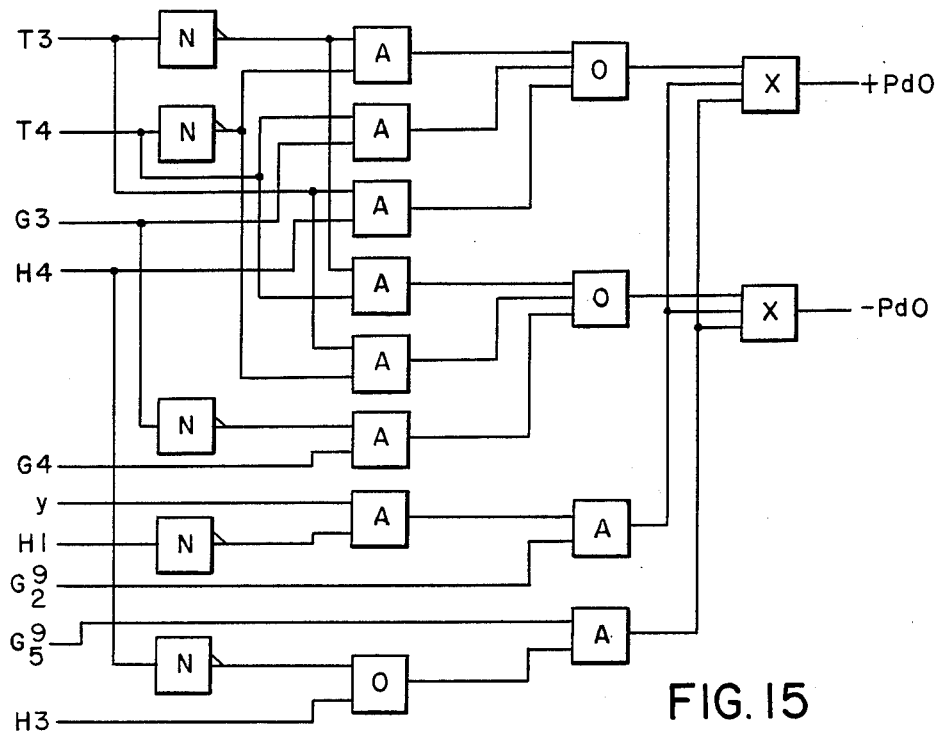
Figure 14:
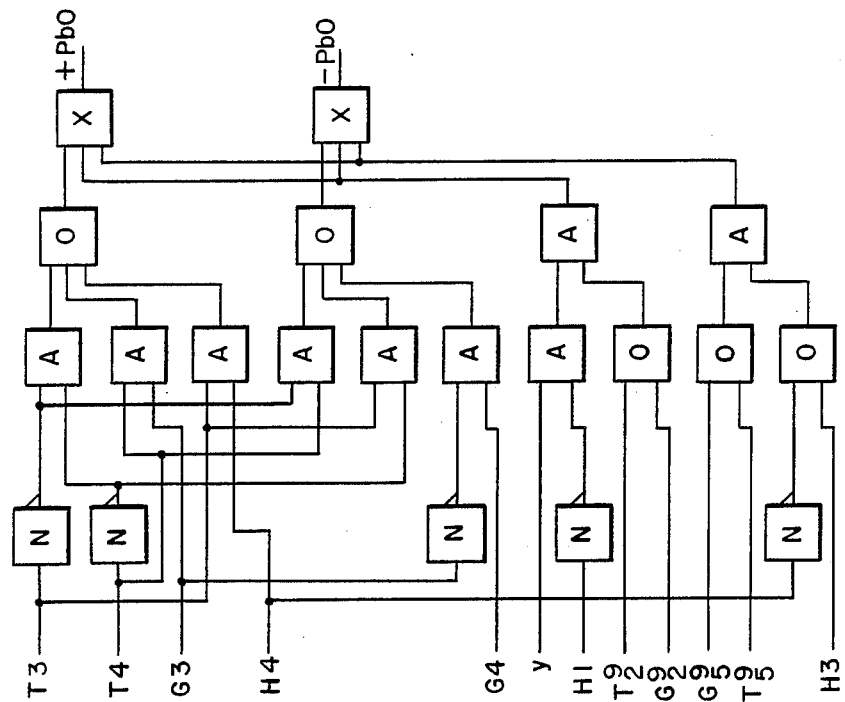
Figure 16:
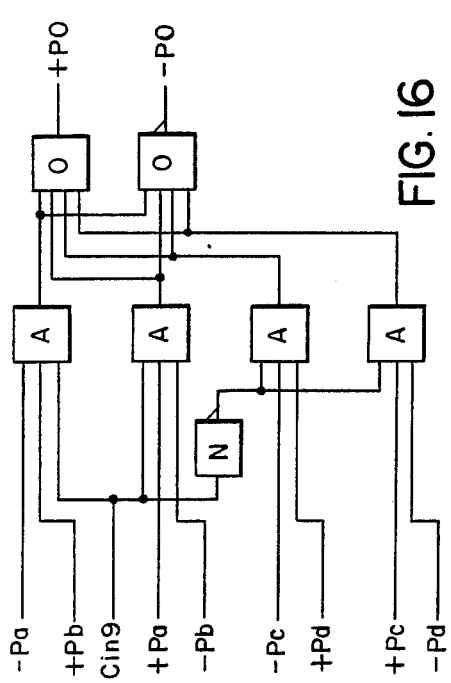
Figure 13:
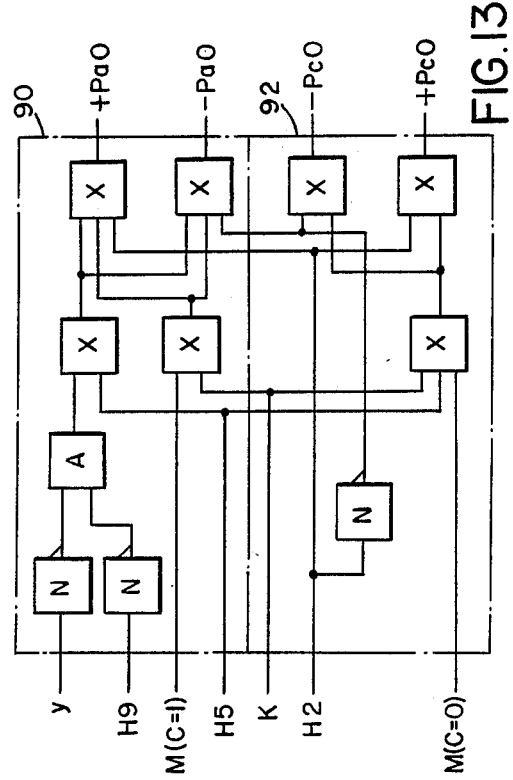

The Pa0, Pb0, Pc0, and Pd0 terms used in equations (G.10) are generated by circuit elements 90, 91, 92, and 93, respectively. Circuit blocks 90 and 92, respectively for producing Pa0 and Pc0, are illustrated in greater detail in FIG. 13. In FIG. 13, the circuit 90 embodies equation (G.9.a), while circuit 92 illustrates a practice of equation (G.9.c). Circuit elements 91 and 93, for producing Pb0 and Pd0, respectively, are illustrated in greater detail in FIGS. 14 and 15, respectively. The circuit for producing PB0 which is illustrated in FIG. 14 is an embodiment of equation (G.9.b), while the circuit for producing Pd0, detailed in FIG. 15, is an implementation of equation (G.9.d). As is illustrated in FIGS. 13-15, the Pa0, Pb0, Pc0, and Pd0 terms are provided in complementary form, which is also indicated in the $\pm$ outputs of circuit blocks 90, 91, 92, and 93 of FIG. 7. As inspection of equation (G.10) reveals, these complementary outputs are necessary for generating the odd parity bit, P0, for sum byte S0. This bit is produced in circuit element 95 of FIG. 7, which is illustrated in greater detail in FIG. 16. FIG. 16 is a combinatorial logic representation of equation (G.10), and provides a complementary output, $+P0$ and $-P0$.

$$(G.10) \; P0 = (Pa \lor Pb)Cin9 + (Pc \lor Pd)Cin9'$$
$$= Pa'PbCin9 + PaPb'Cin9 + Pc'PdCin9' + PcPd'Cin9'$$

It will be evident with reference to FIG. 7 and the methodology of Appendix G that the invention may be practiced to determine even parity over the selected sum bytes by implementation of equation (G.12):

$$(G.12) \to Pe = P0 \; (C=1)'Cin9 + P0(C=0)'Cin9'$$
$$= (Pa \lor Pb)'Cin9 + (Pc \lor Pd)'Cin9'$$
$$= Pa'Pb'Cin9 + PaPbCin9 + Pc'Pd'Cin9' + PcPdCin9'$$

Thus, in order to predict either odd or even parity for byte 0, the following quantities must be computed.

$$\pm Pa, \pm Pb, \pm Pc, \pm Pd$$

To compute the complements $(-Pa, -Pb, -Pc, -Pd)$ it is enough to negate an odd number of terms exclusive-ORed in the expressions. For Pa and Pc, the choice made is the negation of either H2 or H5, and for Pb and Pd, $$(T3'T4' + T4G3 + T3H4)' = T4T3' + T3T4' + G3'G4$$

With the same procedure, odd or even parity for sum bytes 1, 2, and 3 can be derived.

In implementing equations G.10 and G.11 in a specific technology, the following algorithm can be used to produce the predicted parity signals:

Step 1.
Generate all the terms present in the expressions of step 2, namely $\pm Xj$, $\pm Yj$, $\pm Zj$ as needed.
Step 2.
Generate:
Xa, Ya, $\pm Za$ $\pm Xb$, Yb, Zb Xc, $\pm Yc$, Zc $\pm Xd$, Yd, Zd
Step 3.
Generate:
$\pm Pa$, $\pm Pb$, $\pm Pc$, $\pm Pd$
Step 4.
Generate:
P0 or Pe If a technology has available the arrays or the equivalent ones as described in FIGS. 17–20, then it can be concluded that each step requires a single logic level and parity predict can be computed in four logic levels.

The methodology of Appendix G can also be implemented in a four stage odd parity predict circuit using AND-INVERT (AI) gates and including the dot-AND function. The maximum gate configuration required is a 6-way-AI and a maximum dot-AND of seven. This embodiment is shown schematically in FIGS. 17 through 20.

Figure 17:
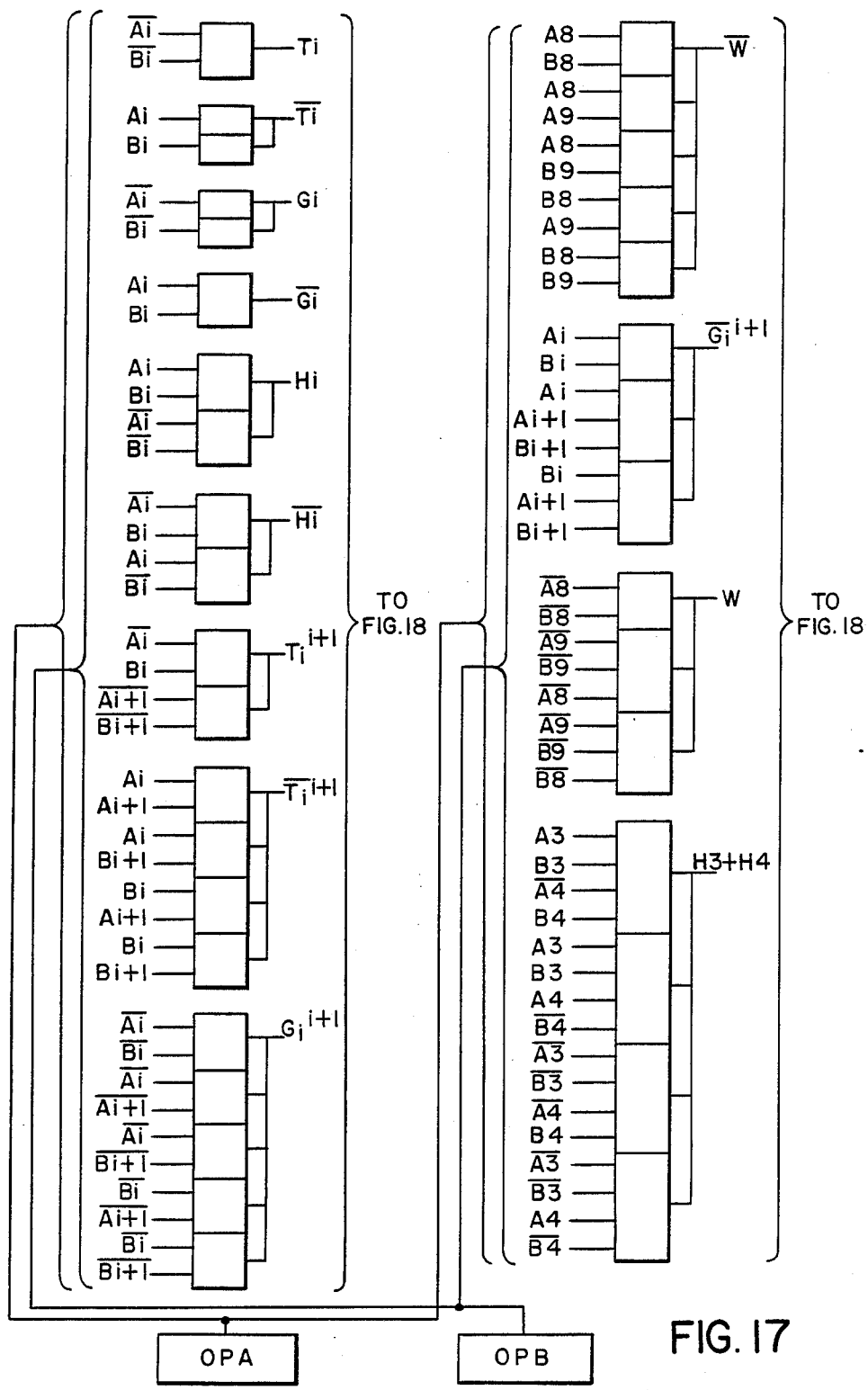
FIGS. 17–20 are logic diagrams illustrating implementation of the invention in AND-INVERT (AI) combinatorial technology.
Figure 18:
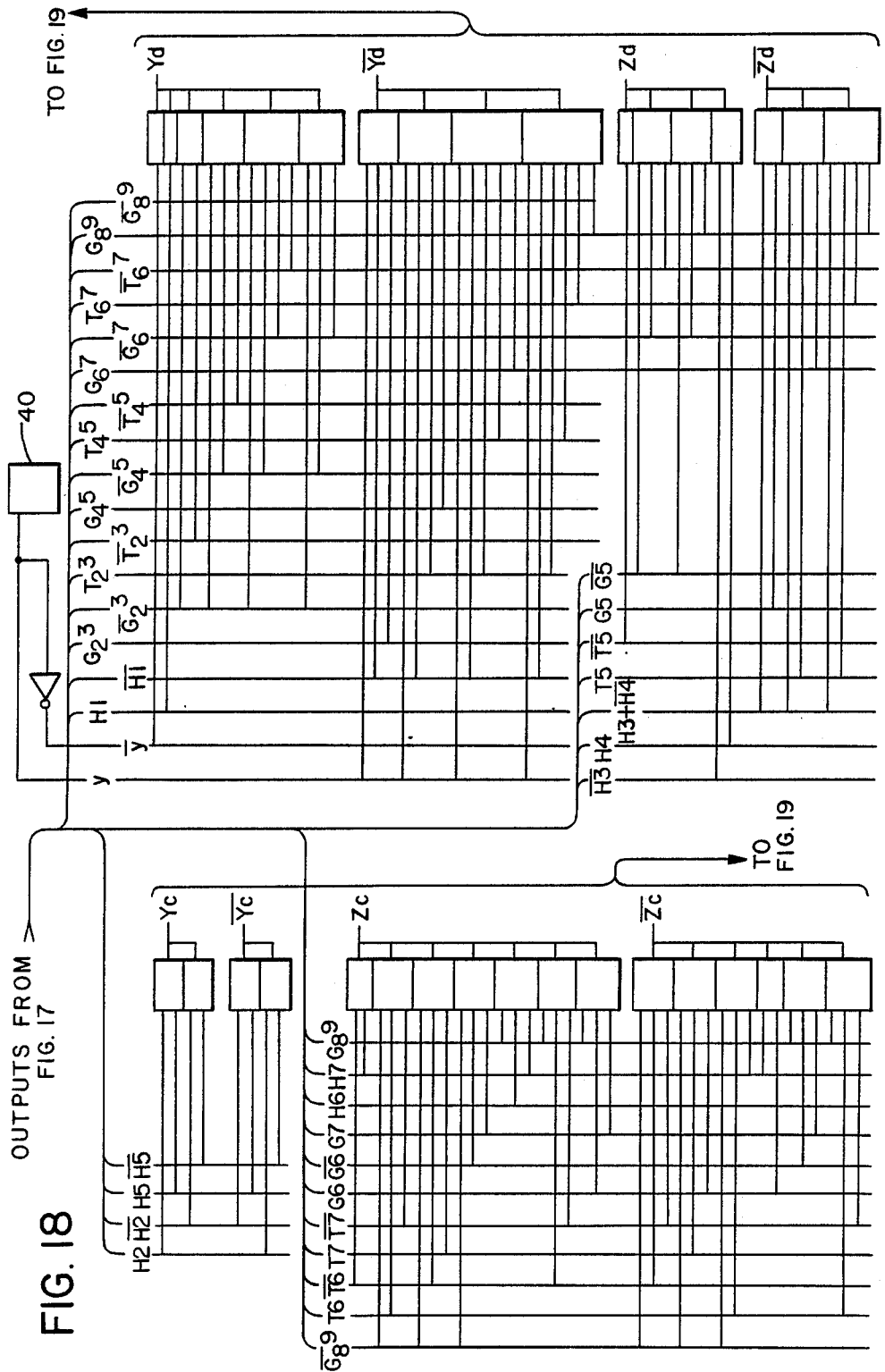
Figure 19A:
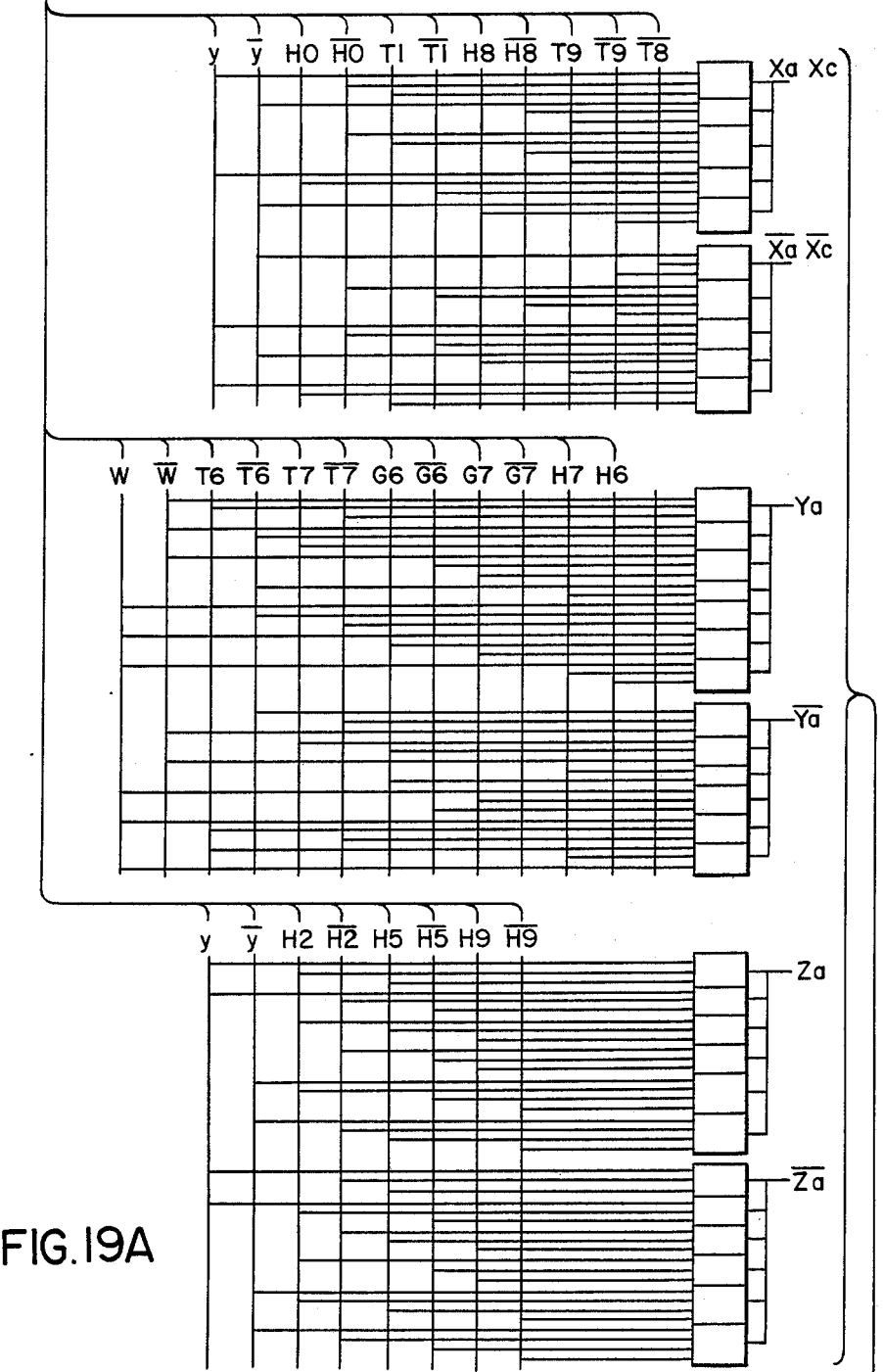
Figure 19B:
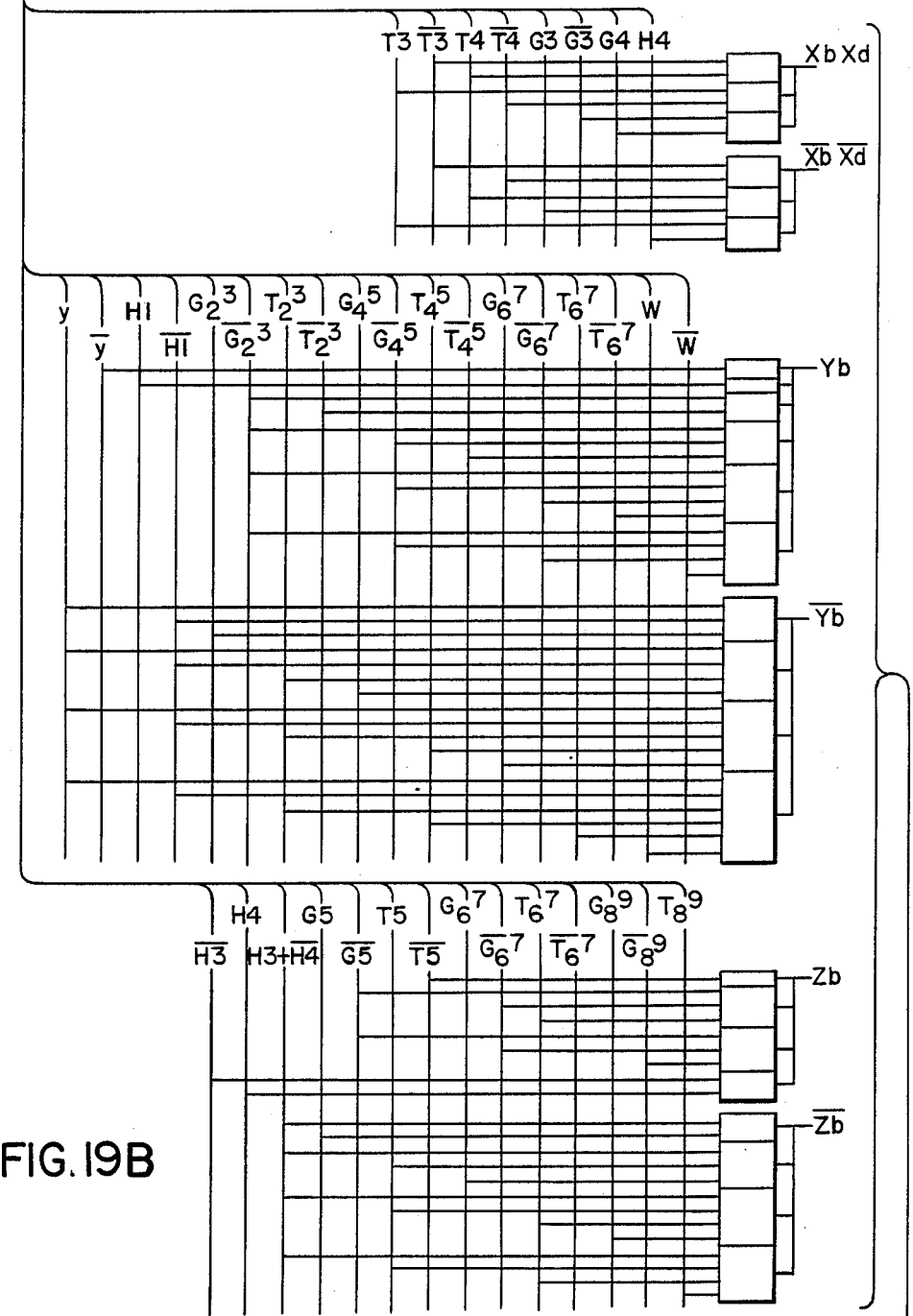
Figure 20:
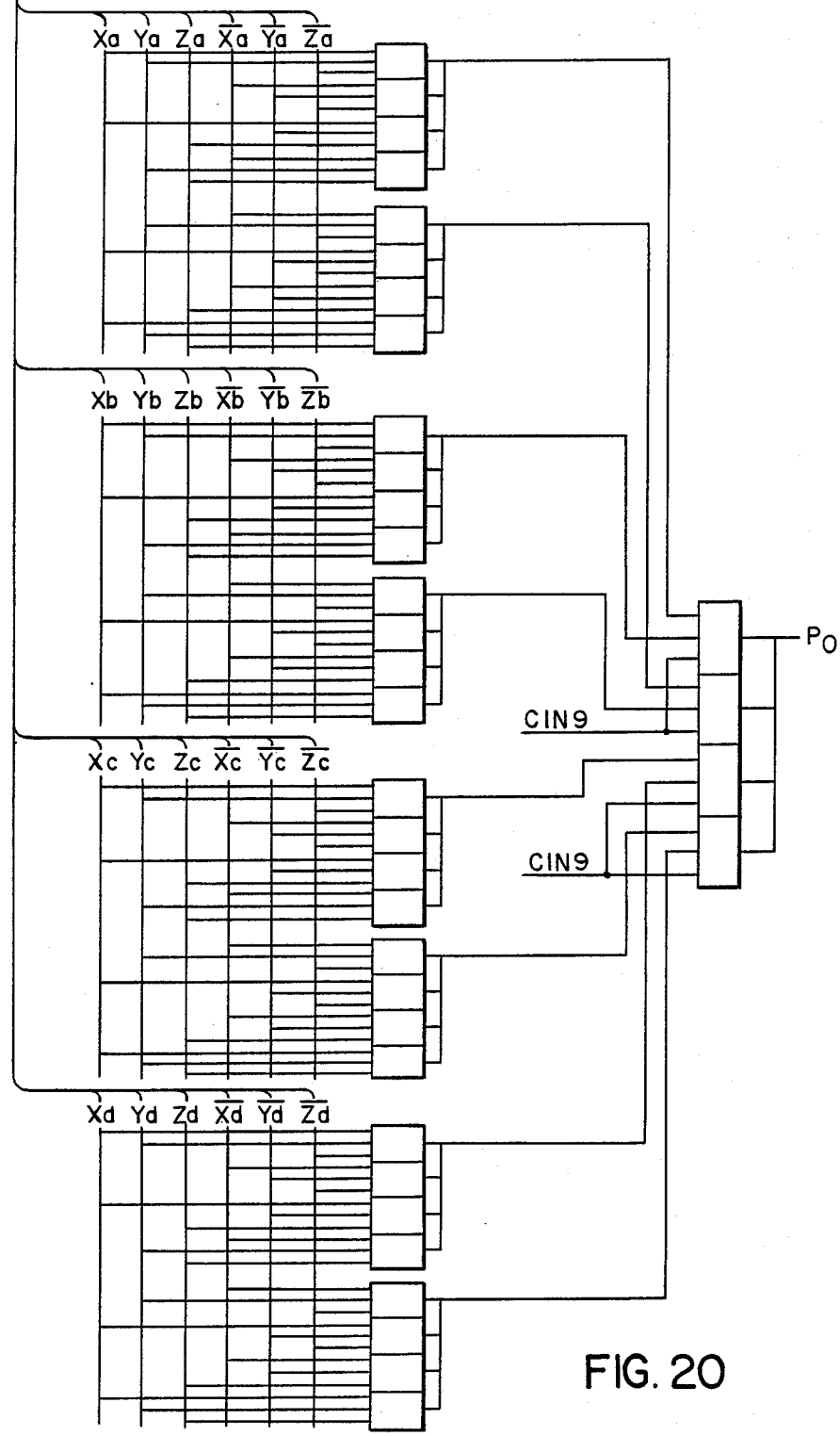

In FIG. 17-20, each square represents a conventional AI gate. Each AI gate has at least two inputs, each indicated by horizontal lines coming into its left-hand vertical side, and a single output emerging from its right-hand vertical side. When the outputs of two or more AI gates are connected to a common node, the common node indicates the conventional dot-AND function. The input signals of each gate in the Figures correspond either to terms found in the equations of Appendix G or to the outputs of AI gates occupying a previous level. The circuit levels ascend from FIG. 17 through FIG. 20. Thus, FIG. 17 represents all of the gates necessary to implement the first level, and FIG. 20 all of the gates required to embody the fourth level of circuitry.

Given the fact that a direct implementation of parity prediction which does not practice this invention creates parity for both the least and most 32 significant bits of the adder, a large amount of hardware is required (namely, hardware for choice y and for y'). This could result in a prohibitive delay because the parity for both choice y and choice y' must be produced before the selection of the final parity bits occurs, thus imposing an extra stage of delay in respect to parity predict for a 32-bit adder.

This invention, instead of producing the parity as in equation (1), which implies that $P(m,m+7)$ and $P(n,n+7)$ must be produced, groups the terms in such a way that the parity of the choice-independent bits, $P(m+2,m+7)$, is produced only once, thus improving hardware economy.

Generally, in the practice of the invention, both $P0(C=1)$ and $P0(C=0)$ are produced, and then P0. The invention breaks each of those paths into more than one; namely, the ones that produce $\pm Pa$ and $\pm Pb$ for $P(C=1)$ and $\pm Pc$ and $\pm Pd$ for $P(C=0)$. The direct impact on the parity predict circuitry is that the number of exclusive-ORs used in a single path is significantly reduced without changing the expressions that are exclusive-ORed together, thus implying that the above quantities can be calculated faster. The final parity can be produced with a 3×4 AND-OR (AO) array or equivalent, instead of a 2×2 AO suggesting that both expressions can be computed in a single stage. Though it is true that some additional hardware is required for the $-Pa$, $-Pb$, $-Pc$, and $-Pd$ terms needed for equation (G.10), this expenditure is justified because $+Pa$, $+Pb$, $+Pc$, and $+Pd$ can be produced faster than $P(C=1)$ and $P(C=0)$, which results in the savings of logic levels provided that a 3×4 AO or equivalent can be computed in one logic level. The expressions that are exclusive-ORed together are not prohibitive to be produced. The "worst" quantities can be produced in two stages of delay with the availability of a 6×5 and a 4×6 AO or equivalent array.

It can be concluded from this description that, provided a technology offers 6-way AIs and AND-dotting of 7, the parity prediction for a 34-bit adder with selection on the final result can be produced in 4 logic levels.

The invention being thus described, it will be obvious that the same may vary in many ways. For example, the grouping of bits need not be 2,3,3, but 3,3,2 etc. without being considered as a departure from the scope of the present invention. Also, although selection is performed for 32 bits from a 34 bit adder result, the invention can be regarded as pertaining to a selection of any number of result bits from an adder having a result with any number of bits. Such variations are not to be regarded as a departure from the spirit and scope of the invention, and all such modifications as would be obvious to one skilled in the art are intended to be included within the scope of the appended claims.

APPENDIX A

In deriving the parity prediction equations, the following notations and boolean equivalencies will be used:

1. Notations (A.1.1) ' is the not of the expression
(A.1.2) (a+b) is the logical OR of "a" and "b"
(A.1.3) (ab) is 'a' logical AND 'b'
(A.1.4) V is an exclusive-OR(XOR)
(A.1.5) Ti is the carry transmit of bit i
(A.1.6) Gi is the carry generate of bit i
(A.1.7) Hi is the half sum of bit i
(A.1.8) Tx-y is the carry transmit signal from bit x to bit y
(A.1.9) Gx-y is the carry generate signal from bit x to bit y
(A.1.10) Pcx-y is the parity of the carries from bit x to bit y
(A.1.11) Psx-y is the parity of the sum from bit x to bit y
(A.1.12) O is the most significant bit
(A.1.13) $\pm Pa$ means both Pa and Pa' are produced

2. Boolean Equivalencies (A.2.1) $1 \vee a = a'$
(A.2.2) $a+b = a \vee b \vee ab$
(A.2.3) $a+a'b = a+b$
(A.2.4) $Ti = (ai+bi)$
(A.2.5) $Gi = (aibi)$
(A.2.6) $Hi = (ai \vee bi) = TiGi'$

APPENDIX B

For the parity of byte SO, i=0, and:

$$P0 = yP(0,1) \vee P(2,7) \vee y'P(8,9) \tag{3}$$

$$P0 = yP(0,1) \vee P(2,4) \vee P(5,7) \vee y'P(8,9) \tag{B.1}$$

It is known that the parity for addition obeys the following law.

$$Ps = Pa \vee Pb \vee Pc \tag{B.2}$$

Ps is the parity of the sum, Pa and Pb are respectively the parity of addends A and B, and Pc is the parity of the carries. In adopting the convention of 1 bit parity per sum byte, equation (B.2) has to be produced for the byte. In doing this, a grouping of the byte is imposed, and this derivation is based on a 2-3-3 grouping, that is, s0s1, s2s3s4, and s5s6s7.

The parity for the eight bit sum byte s0 is calculated by XORing the bits s0–s7 of that word. By the 2-3-3 grouping above:

$$Ps0-7 = Ps0-1 \vee Ps2-4 \vee Ps5-7 \tag{B.3}$$

Now, the parity equation may be expressed as $$Ps5-7 = Pa5-7 \vee Pb5-7 \vee Pc5-7$$

$$Ps2-4 = Pa2-4 \vee Pb2-4 \vee Pc2-4$$

$$Ps0-1 = Pa0-1 \vee Pb0-1 \vee Pc0-1$$

In a group of 3 bits, the carries are computed by $Cin$ = carry into the group $Ci = GI + TiCin$ $Ci-1 = Gi-1 + (Ti-1)Gi + (Ti-1)TiCin$ $Ci-2$ = carry out of the group Thus, carries in the group s5 to s7 are equal to
$Cin$ = previous carry
$C7 = G7 + T7Cin$ $C6 = G6 + T6G7 + T6T7Cin$ $C5 = Cout$ thus, $Pc5-7 = Cin \vee C7 \vee C6$ $$Pc5\text{-}7 = Cin \lor (G7 + T7Cin) \lor (G6 + T6G7 + T6T7Cin) \quad (B.4)$$

Using equivalence A.2.1, A.2.2 and A.2.6,
$$G7 + T7Cin = G7 \lor T7Cin \lor G7T7Cin$$

$$G7 + T7Cin = G7 \lor T7Cin\,(1 \lor G7)$$

$$G7 + T7Cin = G7 \lor H7Cin \quad (B.5)$$

By the same method the final term in equation B.4 reduces.
$$G6 + T6G7 + T6T7Cin = G6 \lor T6G7 \lor G6T6G7 \lor T6T7Cin \lor G6T6T7Cin \lor T6T7G7Cin \lor T6T7G6G7Cin \quad (B.6)$$

Let
$$x = T6G7 \quad \lor \quad G6T6G7 = T6G7(1 \lor G6) = T6G7G6' = H6G7$$
$$y = T6T7Cin(1 \lor G6) = H6T7Cin$$
$$z = T6T7G7Cin(1 \lor G6) = H6T7G7Cin$$

Then, G6 + TgG7 + T6T7Cin = G6 $\lor$ x $\lor$ y $\lor$ z
= G6 $\lor$ H6G7 $\lor$ H6T7Cin $\lor$ H6T7G7Cin
= G6 $\lor$ H6G7 $\lor$ H6T7Cin(1 $\lor$ G7) →
(B.7) G6 + T6G7 + T6T7Cin = G6 $\lor$ H6G7 $\lor$ H6H7Cin.

The substitution of equations B.5 and B.7 into equation B.4 results in:

Pc5-7 = Cin $\lor$ (G7 $\lor$ H7Cin) $\lor$ (G6 $\lor$ H6G7 $\lor$ H6H7Cin)
= G6 $\lor$ G7 $\lor$ H6G7 $\lor$ Cin(1 $\lor$ H7 $\lor$ H6H7)
= G6 $\lor$ G7 $\lor$ H6G7 $\lor$ Cin(1 $\lor$ H7(1 $\lor$ H6))
= G6 $\lor$ G7 $\lor$ H6G7 $\lor$ Cin(1 $\lor$ H7H6') →
(B.8) Pc5-7 = G6 $\lor$ G7 $\lor$ H6G7 $\lor$ Cin(H7' + H6)

And with a similar derivation,
$$Pc2\text{-}4 = G3 \lor G4 \lor H3G4 \lor Cin1(H4' + H3) \quad (B.9)$$

Pc0-1 is a group of two and the carries for this group are $$Cin2 = \text{carry in}$$

$$C1 = G1 + T1Cin2$$

$$C0 = \text{carry out}$$

A simplified expression for the parity of the carries of the group of bits 0 and 1 is derived below.

Pc0-1 = Cin2 $\lor$ C1
= Cin2 $\lor$ (G1 + T1Cin2)
= Cin2 $\lor$ G1 $\lor$ T1Cin2 $\lor$ G1T1Cin2
= Cin2 $\lor$ G1 $\lor$ T1Cin2(1 $\lor$ G1)
= Cin2 $\lor$ G1 $\lor$ H1Cin 2
= G1 $\lor$ Cin2(1 $\lor$ H1) →
(B.10) Pc0-1 = G1 $\lor$ H1'Cin2

The predicted parity of the carries of the groups within the byte is summarized in the following three equations:

$$Pc5\text{-}7 = G6 \lor G7 \lor H6G7 \lor Cin(H7' + H6) \quad (B.8)$$

$$Pc2\text{-}4 = G3 \lor G4 \lor H3G4 \lor Cin1(H4' + H3) \quad (B.9)$$

$$Pc0\text{-}1 = G1 \lor H1'Cin2 \quad (B.10)$$

PARITY OF THE GROUPS

Using the equations for parity predict of the carries, the parity of the sum groups can now be derived.

For the group of bits 5, 6, and 7, Pa and Pb are equal to:

$$Pa5\text{-}7 = A5 \lor A6 \lor A7$$

$$Pb5\text{-}7 = B5 \lor B6 \lor B7$$

Thus, the parity of the sum of bits 5-7 is:

$$Ps5\text{-}7 = A5 \lor A6 \lor A7 \lor B5 \lor B6 \lor B7 \lor G6 \lor G7 \lor H6G7 \lor Cin(H7' + H6)$$

But, $$A6 \lor B6 \lor G6 = A6 \lor B6 \lor A6B6 = A6 + B6 = T6.$$

$$A7 \lor B7 \lor G7 = T7.$$

and $$A5 \lor B5 = H5;$$

thus, $$Ps5\text{-}7 = T6 \lor T7 \lor H5 \lor H6G7 \lor Cin(H7' + H6). \quad (B.11)$$

In the same manner, the other group parity of the sums are derived. The following is the result.

$$Ps2\text{-}4 = T3 \lor T4 \lor H2 \lor H3G4 \lor Cin1(H4' + H3) \quad (B.12)$$

$$Ps0\text{-}1 = T1 \lor H0 \lor H1'Cin2 \quad (B.13)$$

Equation B.11 implies the following transformation.

Ps5-7 = T6 $\lor$ T7 H5 $\lor$ H6G7 $\lor$ (H7' + H6)Cin
= T6 $\lor$ T7(Cin + Cin') $\lor$ H5 $\lor$ H6G7 $\lor$ (H7' + H6)Cin
= T6 $\lor$ T7Cin $\lor$ T7Cin' $\lor$ H5 $\lor$ H6G7 $\lor$ (H7' + H6)Cin But,
T7Cin $\lor$ Cin(H7' + H6) = Cin(T7 $\lor$ (H7' + H6))
= Cin(T7'(H7' + H6) + T7H7H6')
= Cin(T7' + T7'H6 + T7H7H6')
= Cin(T7' + T7H7H6')
= Cin(T7' + T7T7G7'H6')
= Cin(T7' + T7G7'H6')
= Cin(T7' + G7'H6')

Thus,
Ps5-7 = H5 $\lor$ T6 $\lor$ H6G7 $\lor$ T7Cin' $\lor$ Cin(T7' + G7'H6')
And given that
T7Cin' $\lor$ Cin(T7' + G7'H6') = Cin(T7' + G7'H6') + T7Cin'
then,
Ps5-7 = H5 $\lor$ T6 $\lor$ H6G7 $\lor$ ((T7' + G7'H6')Cin + T7Cin').
But, T6 $\lor$ H6G7 = G6 + T6G7 thus,
(B.14) Ps5-7 = H5 $\lor$ (G6 + T6G7') $\lor$ ((T7' + G7'G6')Cin + T7Cin')

The parity of the sum of bits 5 to 7 in equation B.14 has only two exclusive-ORs, and a similar expression for bits 2 to 4 can be derived in the same manner.

$$Ps2\text{-}4 = H2 \vee (G3 + T3G4') \vee ((T4' + G4'H3')Cin1 + T4Cin1') \quad (B.15)$$

The parity of the sum for bits 0 and 1 is reduced in a similar manner.

$$
\begin{aligned}
Ps0\text{-}1 &= H0 \vee T1Cin2 \vee T1Cin2' \vee H1'Cin2 \\
&= H0 \vee T1Cin2 \vee T1Cin2' \vee (T1' + G1)Cin2 \\
&= H0 \vee T1Cin2' \vee Cin2(T1 \vee (T1' + G1)) \\
&= H0 \vee T1Cin2' \vee Cin2(T1'(T1' + G1) + T1(T1G1')) \\
&= H0 \vee T1Cin2' \vee Cin2(T1' + T1G1') \\
&= H0 \vee T1Cin2' \vee Cin2(T1' + G1') \\
&= H0 \vee (T1Cin2'(Cin2' + T1G1) + Cin2(T1' + G1')(T1' + Cin2)) \\
&= H0 \vee (T1Cin2' + Cin2(T1' + G1')) \\
(B.16)\ Ps0\text{-}1 &= H0 \vee (T1Cin2' + G1'Cin2)
\end{aligned}
$$

Thus, the parity of the sum for the groups within the byte have been reduced to the following three equations:

$$Ps5\text{-}7 = H5 \vee (G6 + T6G7') \vee ((T7' + G7'H6')Cin + T7Cin') \quad (B.14)$$

$$Ps2\text{-}4 = H2 \vee (G3 + T3G4') \vee ((T4' + G4'H3')Cin1 + T4Cin1') \quad (B.15)$$

$$Ps0\text{-}1 = H0 \vee (T1Cin2' + G1'Cin2) \quad (B.16)$$

Another form of the parity of the sum of a byte can be derived from equations B.11 to B.13. This reduction uses only positive carry-in terms which might be the case in some implementations. The following is the reduction.

$$
\begin{aligned}
(B.11)\ Ps5\text{-}7 &= T6 \vee T7 \vee H5 \vee H6G7 \vee Cin(H7' + H6) \\
&= T7 \vee H5 \vee Cin(H7' + H6) \vee T6 \vee T6G6'G7 \\
&= T7 \vee H5 \vee Cin(H7' + H6) \vee T6(1 \vee G6'G7) \\
&= T7 \vee H5 \vee Cin(H7' + H6) \vee H6 \vee (G6 + T6G7') \rightarrow \\
(B.17)\ Ps5\text{-}7 &= H5 \vee T7 \vee (G6 + T6G7') \vee Cin(H7' + H6) \\
\text{Therefore,} & \\
(B.18)\ Ps2\text{-}4 &= H2 \vee T4 \vee (G3 + T3G4') \vee Cin1\ (H4' + H3)
\end{aligned}
$$

The equations for this second form of reduction are summarized below:

$$Ps5\text{-}7 = H5 \vee T7 \vee (G6 + T6G7') \vee Cin(H7' + H6) \quad (B.17)$$

$$Ps2\text{-}4 = H2 \vee T4 \vee (G3 + T3G4') \vee Cin1(H4' + H3) \quad (B.18)$$

$$Ps0\text{-}1 = T1 \vee H0 \vee H1'Cin2 \quad (B.13)$$

Two forms for the parity of the sum of the groups have been derived; the first form is equations B.14, B.15 and B.16, and the second form is equations B.17, B.18 and B.13. The next step in the derivation is to show how these equations can be used to determine the parity of a byte of the sum.

By substituting equations B.13 to B.17 into B.1, several expressions can be derived that produce the parity into byte 0 of the sum. The derivation of one such expression follows.

Using (B.13):

$$P(0,1) = H0 \vee T1 \vee H1'Cin(0,1)$$

$$P(8,9) = H8 \vee T9 \vee H9'Cin(8,9)$$

and (B.18):

$$P(2,4) = H2 \vee T4 \vee (G3 + T3G4') \vee Cin(2,4)(H4' + H3)$$

and (B.14):

$$
\begin{aligned}
P(5,7) &= H5 \vee (G6 + T6G7') \vee ((T7' + G7'H6')Cin(5,7) + T7Cin(5,7)') \\
(B.1) \Rightarrow P0 &= y(H0 \vee T1 \vee H1'Cin(0,1)) \vee H2 \vee T4 \vee (G3 + T3G4') \\
&\quad \vee Cin(2,4)(H4' + H3) \vee H5 \vee (G6 + T6G7') \vee ((T7' + G7'H6')Cin(5,7) + T7Cin(5,7)') \vee \\
&\quad y'(H8 \vee T9 \vee H9'Cin(8,9))
\end{aligned}
$$

Using equivalencies:

$$
\begin{aligned}
yT1 \vee y'H8 &= yT1 + y'H8 \\
yH0 \vee y'T9 &= yH0 + y'T9 \\
yH1'Cin(0,1) \vee y'H9'Cin(8,9) &= yH1'Cin(0,1) + y'H9'Cin(8,9) \\
(B.19)\ P0 &= (yT1 + y'H8) \vee (yH0 + y'T9) \vee (yH1'Cin(0,1) + y'H9'Cin(8,9)) \vee H2 \vee T4 \vee \\
&\quad (G3 + T3G4') \vee Cin(2,4)\ (H4' + H3) \vee H5 \vee \\
&\quad (G6 + T6G7') \vee ((T7' + G7'H6')Cin(5,7) + T7Cin(5,7)')
\end{aligned}
$$

The carries can be expressed in terms of the carry into the byte, Cin, as follows:

$$
\begin{aligned}
(B.20)\quad & Cin(8,9) = Cin \\
(B.21)\quad & Cin(5,7) = G(8,9) + T(8,9)Cin \\
(B.22)\quad & Cin(2,4) = G(5,9) + T(5,9)Cin \\
(B.23)\quad & Cin(0,1) = G(2,9) + T(2,9)Cin \\
\text{Thus:} & \\
(B.19) \Rightarrow & \\
(B.24)\quad P0 &= (yT1 + y'H8) \vee (yH0 + y'T9) \vee \\
&\quad (yH1'(G(2,9) + T(2,9)Cin) + y'H9'Cin) \vee \\
&\quad H2 \vee T4 \vee H5 \vee \\
&\quad (G3 + T3G4') \vee (H4' + H3)(G(5,9) + T(5,9)Cin) \vee \\
&\quad (G6 + T6G7') \vee \\
&\quad ((T7' + G7'H6')\ (G(8,9) + T(8,9)Cin) + T7(G(8,9) + T(8,9)Cin)')
\end{aligned}
$$

The other possible formulas that can be derived by substituting equations (B.13) to (B.19) into (B.1) are found in Appendix C.

APPENDIX C

By substituting equations B.13 through B.18 into B.1 several expressions can be derived that produce the parity of byte S0 of the result (and with analogous substitutions for the remaining bytes). The derivation of one such expression follows:

Using (B.13):

$$P(0,1) = H0 \vee T1 \vee H1'Cin(0,1)$$
$$P(8,9) = H8 \vee T9 \vee H9'Cin(8,9)$$

And (B.18):

$$P(2,4) = H2 \vee T4 \vee (G3 + T3G4') \vee Cin(2,4)(H4' + H3)$$

And (B.14):

$$P(5,7) = H5 \vee (G6 + T6G7') \vee ((T7' + G7'H6')Cin(5,7) + T7Cin(5,7)')$$

$$
\begin{aligned}
(B.1) \Rightarrow & \\
(C.1)\quad P0 &= y(H0 \vee T1 \vee H1'Cin(0,1)) \vee H2 \vee T4 \vee \\
&\quad (G3 + T3G4') \vee Cin(2,4)(H4' + H3) \vee \\
&\quad H5 \vee (G6 + T6G7') \vee ((T7'\ G7'H6') Cin(5,7) + T7Cin(5,7)') \vee y'(H8 \vee T9 \vee H9'Cin(8,9))
\end{aligned}
$$

Using the equivalent forms:

$$yT1 \lor y'H8 = yT1 + y'H8$$
$$yH0 \lor y'T9 = yH0 + y'T9$$
$$yH1'Cin(0,1) \lor y'H9'Cin(8,9) = yH1'Cin(0,1) + y'H9'Cin(8,9)$$

(B.1) =>
(C.2)    P0 = H2 V T4 V (G3 + T3G4') V (H3 + H4') Cin(2,4) V H5 V
         (G6 + T6G7') V ((T7' + G7'H6')Cin(5,7) + T7Cin(5,7)')
         V (yT1 + y'H8) V (yH0 + y'T9) V
         (yH1'Cin(0,1) + y'H9'Cin(8,9))

Likewise using the equivalent forms:

$$yT1 \lor y'T9 = yT1 + y'T9$$
$$yH0 \lor y'H8 = yH0 + y'H8$$

(B.1) =>
(C.3)    P0 = H2 V T4 V (G3 + T3G4') V (H3 + H4') Cin(2,4) V H5 V
         (G6 + T6G7') V ((T7' + G7'H6')Cin(5,7) + T7Cin(5,7)') V (yT1 + y'T9) V (yH0 + y'H8)
         V (yH1'Cin(0,1) + y'H9'Cin(8,9)

By the same method the following results may be derived:

(B.13) =>   P(0,1) = H0 V T1 V H1'Cin(0,1)
(B.18) =>   P(2,4) = H2 V T4 V (G3 + T3G4') V Cin(2,4) (H4' + H3)
(B.17) =>   P(5,7) = H5 V T7 V (G6 + T6G7') V Cin(5,7) (H7' + H6)
(B.13) =>   P(8,9) = H8 V T9 V H9'Cin(8,9)
(C.4)       P0 = H2 V T4 V (G3 + T3G4') V (H3 + H4') Cin(2,4) V
            H5 V T7 V (G6 + T6G7') V Cin(5,7)
            (H7' + H6) V
            (yT1 + y'H8) V (yH0 + y'T9) V
            (yH1'Cin(0,1) + y'H9'Cin(8,9))

Or:
(C.5)       P0 = H2 V T4 V (G3 + T3G4') V Cin(2,4)(H3 + H4') V
            H5 V T7 V (G6 + T6G7') V Cin(5,7)
            (H7' + H6) V
            (yT1 + y'T9) V (yH0 + y'H8) V
            (yH1'Cin(0,1) + y'H9'Cin(8,9))

(B.13) =>   P(0,1) = H0 V T1 V H1'Cin(0,1)
(B.18) =>   P(2,4) = H2 V T4 V (G3 + T3G4') V Cin(2,4) (H4' + H3)
(B.17) =>   P(5,7) = H5 V T7 V (G6 + T6G7') V Cin(5,7) (H7' + H6)
(B.16) =>   P(8,9) = H8 V (T9Cin(8,9)' + G9'Cin(8,9))

Using the equivalent forms:

$$yH0 \lor T1y \lor y'H8 = y(H0'T1 + H0T1') + y'H8$$
$$y'(T9Cin(8,9)' + G9'Cin(8,9)) \lor yH1'Cin(0,1) = yH1'Cin(0,1) + y'(T9Cin(8,9)' + G9'Cin(8,9))$$

(C.6)       P0 = H2 V T4 V (G3 + T3G4') V Cin(2,4)
            (H3 + H4') V
            H5 V T7 V (G6 + T6G7') V Cin(5,7)
            (H7' + H6) V
            (y(H0'T1 + H0T1') + y'H8) V
            (yH1'Cin(0,1) + y'(T9Cin(8,9)' + G9'Cin(8,9)))

(B.13) =>   P(0,1) = H0 V T1 V H1'Cin(0,1)
(B.18) =>   P(2,4) = H2 V T4 V (G3 + T3G4') V Cin((2,4)(H4' + H3))
(B.14) =>   P(5,7) = H5 V (G6 + T6G7') V
            ((T7' + G7'H6')Cin(5,7) + T7Cin(5,7)')
(B.16) =>   P(8,9) = H8 V (T9Cin(8,9)' + G9'Cin(8,9))
(C.7)       P0 = H2 V T4 V (G3 + T3G4') V Cin(2,4)
            (H3 + H4') V
            H5 V (G6 + T6G7') V
            ((T7' + G7'H6')Cin(5,7) + T7Cin(5,7)') V
            ((H0'T1 + H0T1')y + H8y') V
            (H1'Cin(0,1)y + (T9Cin(8,9)' + G9'Cin(8,9))y')

(B.13) =>   P(0,1) = H0 V T1 V H1'Cin(0,1)
(B.18) =>   P(2,4) = H2 V (G3 + T3G4') V
            ((T4' + G4'H3')Cin(2,4) + T4Cin(2,4)')
(B.17) =>   P(5,7) = H5 V T7 V (G6 + T6G7') V Cin(5,7)
            (H7' + H6)
(B.16) =>   P(8,9) = H8 V T9 V H9'Cin(8,9)
(C.8)       P0 = H2 V (G3 + T3G4') V
            ((T4' + G4'H3')Cin(2,4) + T4Cin(2,4)') V
            H5 V T7 V (G6 + T6G7') V Cin(5,7)
            (H7' + H6) V
            (yT1 + y'H8) V (yH0 + y'T9) V
            (yH1'Cin(0,1) + y'H9'Cin(8,9))

Or:
(C.9)       P0 = H2 V (G3 + T3G4') V
            ((T4' + G4'H3')Cin(2,4) + T4Cin(2,4)') V
            H5 V T7 V (G6 + T6G7') V Cin(5,7)
            (H7' + H6) V
            (yT1 + y'T9) V (yH0 + y'H8) V
            (yH1'Cin(0,1) + y'H9'Cin(8,9))

(B.13) =>   P(0,1) = H0 V T1 V H1'Cin(0,1)
(B.15) =>   P(2,4) = H2 V (G3 + T3G4') V
            ((T4' + G4'H3')Cin(2,4) + T4Cin (2,4)')
(B.17) =>   P(5,7) = H5 V T7 V (G6 + T6G7') V Cin(5,7)
            (H7' + H6)
(B.16) =>   P(8,9) = H8 V (T9Cin(8,9)' + G9'Cin(8,9))
(C.10)      P0 = H2 V (G3 + T3G4') V

-continued

|  |  |
|---|---|
|  | ((T4' + G4'H3')Cin(2,4) + T4Cin(2,4)') V |
|  | H5 V T7 V (G6 + T6G7') V Cin(5,7) |
|  | (H7' + H6) V |
|  | ((H0'T1 + H0T1')y + H8y') V |
|  | (H1'Cin(0,1)y + (T9Cin(8,9) + G9'Cin(8,9))y') |
| (B.13) => | P(0,1) = H0 V T1 V H1'Cin(0,1) |
| (B.15) => | P(2,4) = H2 V (G3 + T3G4') V |
|  | ((T4' + G4'H3')Cin(2,4) + T4Cin(2,4)') |
| (B.14) => | P(5,7) = H5 V (G6 + T6G7') V |
|  | ((T7'G7'H6')Cin(5,7) + T7Cin(5,7)') |
| (B.16) => | P(8,9) = H8 V T9 V H9'Cin(8,9) |
| (C.11) | P0 = H2 V (G3 + T3G4') V |
|  | ((T4' + G4'H3')Cin(2,4) + T4Cin(2,4)') V |
|  | H5 V (G6 + T6G7') V |
|  | ((T7' + G7'H6')Cin(5,7) + T7Cin(5,7)') V |
|  | (yT1 + y'H8) V (yH0 + y'T9) V |
|  | (yH1'Cin(0,1) + y'H9'Cin(8,9)) |
| Or: |  |
| (C.12) | P0 = H2 V (G3 + T3G4') V |
|  | ((T4' + G4'H3')Cin(2,4) + T4Cin(2,4)') V |
|  | H5 V (G6 + T6G7') V |
|  | ((T7' + G7'H6')Cin(5,7) + T7Cin(5,7)') V |
|  | (yT1 + y'T9) V (yH0 + y'H8) V |
|  | (yH1'Cin(0,1) + y'H9'Cin(8,9)) |
| (B.13) => | P(0,1) = H0 V T1 V H1'Cin(0,1) |
| (B.15) => | P(2,4) = H2 V (G3 + T3G4') V |
|  | ((T4' + G4'H3')Cin(2,4) + T4Cin(2,4)') |
| (B.14) => | P(5,7) = H5 V (G6 + T6G7') V |
|  | ((T7' + G7'H6')Cin(5,7) + T7Cin(5,7)') |
| (B.16) => | P(8,9) = H8 V (T9Cin(8,9)' + G9'Cin(8,9)) |
| (C.13) | P0 = H2 V (G3 + T3G4') V |
|  | ((T4' + G4'H3')Cin(2,4) + T4Cin(2,4)') V |
|  | H5 V (G6 + T6G7') V |
|  | ((T7' + G7'H6')Cin(5,7) + T7Cin(5,7)') V |
|  | ((H0'T1 + H0T1')y + H8y') V |
|  | (H1'Cin(0.1)y + (T9Cin(8,9)' + G9'Cin(8,9))y') |
| (B.16) => | P(0,1) = H0 V (T1Cin(0,1)' + G1'Cin(0,1)) |
| (B.18) => | P(2,4) = H2 V T4 V (G3 + T3G4') V Cin(2,4) |
|  | (H4' + H3) |
| (B.1) => | P(5,7) = H5 V T7 V (G6 + T6G7') V Cin(5,7) |
|  | (H7' + H6) |
| (B.13) => | P(8,9) = H8 V T9 V H9'Cin(8,9) |
| (C.14) | P0 = H2 V T4 V (G3 + T3G4') V Cin(2,4) |
|  | (H3 + H4') V |
|  | H5 V T7 V (G6 + T6G7') V Cin(5,7) |
|  | (H7' + H6) V |
|  | ((H8'T9 + H8T9')y' + H0y) V |
|  | (H9'Cin(8,9)y' + (T1Cin(0,1)' + G1'Cin(0.1))y) |
| (B.16) => | P(0,1) = H0 V (T1Cin(0,1)' + G1'Cin(0,1)) |
| (B.18) => | P(2,4) = H2 V T4 V (G3 + T3G4') V Cin(2,4) |
|  | (H4' + H3 |
| (B.17) => | P(5,7) = H5 V T7 V (G6 + T6G7') V Cin(5,7) |
|  | (H7' + H6) |
| (B.16) => | P(8,9) = H8 V (T9Cin(8,9)' + G9'Cin(8,9)) |
| (C.15) | P0 = H2 V T4 V (G3 + T3G4') V Cin(2,4) |
|  | (H3 + H4') V |
|  | H5 V T7 V (G6 + T6G7') V Cin(5,7) |
|  | (H7' + H6) V |
|  | (H0y + H8y') V (T1Cin(0,1)' + G1'Cin(0,1))y V |
|  | (T9Cin(8,9)' + G9'Cin(8,9))y' |
| (B.16) => | P(0,1) = H0 V (T1Cin(0,1)' + G1'Cin(0,1)) |
| (B.17) => | P(2,4) = H2 V T4 V (G3 + T3G4') V Cin(2,4) |
|  | (H4' + H3) |
| (B.14) => | P(5,7) = H5 V (G6 + T6G7') V |
|  | ((T7' + G7'H6')Cin(5,7) + T7Cin(5,7)') |
| (B.13) => | P(8,9) = H8 V T9 V H9'Cin(8,9) |
| (C.16) | P0 = H2 V T4 V (G3 + T3G4') V Cin(2,4) |
|  | (H3 + H4') V |
|  | H5 V (G6 + T6G7') V |
|  | ((T7' + G7'H6')Cin(5,7) + T7Cin(5,7)') V |
|  | ((H8'T9 + H8T9')y' + H0y) V |
|  | (H9'Cin(8,9)y' + (T1Cin(0,1)' + G1'Cin(0,1))y) |
| (B.16) => | P(0,1) = H0 V (T1Cin(0,1)' + G1'Cin(0,1)) |
| (B.18) => | P(2,4) = H2 V T4 V (G3 + T3G4') V Cin(2,4) |
|  | (H4' + H3) |
| (B.14) => | P(5,7) = H5 V (G6 + T6G7') V |
|  | ((T7' + G7'H6')Cin(5,7) + T7Cin (5,7)') |
| (B.16) => | P(8,9) = H8 V (T9Cin(8,9)' + G9'CIn(8,9)) |
| (C.17) | P0 = H2 V T4 V (G3 + T3G4') V Cin(2,4) |
|  | (H3 + H4') V |

|         |                                                                                                                                                                                                                                     |
|---------|-------------------------------------------------------------------------------------------------------------------------------------------------------------------------------------------------------------------------------------|
|         | H5 V (G6 + T6G7') V                                                                                                                                                                                                                 |
|         | ((T7' + G7'H6')CIn(5,7) + T7Cin(5,7)') V                                                                                                                                                                                            |
|         | (H0y + H8y') V (T1Cin(0,1)' + G1'Cin(0,1))y V                                                                                                                                                                                       |
|         | (T9Cin(8,9)' + G9'Cin(8,9))y'                                                                                                                                                                                                       |
| (B.16) => | P(0,1) = H0 V (T1Cin(0,1)' + G1'CIn(0,1))                                                                                                                                                                                         |
| (B.14) => | P(2,4) = H2 V (G3 + T3G4') V                                                                                                                                                                                                      |
|         | ((T4' + G4'H3')Cin(2,4) + T4Cin(2,4)')                                                                                                                                                                                              |
| (B.18) => | P(5,7) = H5 V T7 V (G6 + T6G7') V Cin(5,7)                                                                                                                                                                                        |
|         | (H7' + H6)                                                                                                                                                                                                                          |
| (B.13) => | P(8,9) = H8 V T9 V H9'Cin(8,9)                                                                                                                                                                                                    |
| (C.18)  | P0 = H2 V (G3 + T3G4') V                                                                                                                                                                                                            |
|         | ((T4' + G4'H3')Cin(2,4) + T4Cin(2,4)') V                                                                                                                                                                                            |
|         | H5 V T7 V (G6 + T6G7') V Cin(5,7)                                                                                                                                                                                                   |
|         | (H7' + H6) V                                                                                                                                                                                                                        |
|         | ((H8'T9 + H8T9')y' + H0y) V                                                                                                                                                                                                         |
|         | (H9'Cin(8,9)y' + (T1Cin(0,1)' +                                                                                                                                                                                                     |
|         | G1'Cin(0,1))y)                                                                                                                                                                                                                      |
| (B.16) => | P(0,1) = H0 V (T1Cin(0,1)' + G1'Cin(0,1))                                                                                                                                                                                         |
| (B.14) => | P(2,4) = H2 V (G3 + T3G4') V                                                                                                                                                                                                      |
|         | ((T4' + G4'H3')Cin(2,4) + T4Cin(2,4)')                                                                                                                                                                                              |
| (B.18) => | P(5,7) = H5 V T7 V (G6 + T6G7') V Cin(5,7)                                                                                                                                                                                        |
|         | (H7' + H6)                                                                                                                                                                                                                          |
| (B.16) => | P(8,9) = H8 V (T9Cin(8,9)' + G9'Cin(8,9))                                                                                                                                                                                         |
| (C.19)  | P0 = H2 V (G3 + T3G4') V                                                                                                                                                                                                            |
|         | ((T4' + G4'H3')Cin(2,4) + T4Cin(2,4)') V                                                                                                                                                                                            |
|         | H5 V T7 V (G6 + T6G7') V Cin(5,7)                                                                                                                                                                                                   |
|         | (H7' + H6) V                                                                                                                                                                                                                        |
|         | (H0y + H8y') V (T1Cin(0,1)' + G1'Cin(0,1))y V                                                                                                                                                                                       |
|         | (T9Cin(8,9)' + G9'Cin(8,9))y'                                                                                                                                                                                                       |
| (B.16) => | P(0,1) = H0 V (T1Cin(0,1)' + G1'Cin(0,1))                                                                                                                                                                                         |
| (B.14) => | P(2,4) = H2 V (G3 + T3G4') V                                                                                                                                                                                                      |
|         | ((T4' + G4'H3')Cin(2,4) + T4Cin(2,4)')                                                                                                                                                                                              |
| (B.14) => | P(5,7) = H5 V (G6 + T6G7') V                                                                                                                                                                                                      |
|         | ((T7' + G7'H6')Cin((5,7) + T7Cin(5,7)')                                                                                                                                                                                             |
| (B.13) => | P(8,9) = H8 V T9 V H9'Cin(8,9)                                                                                                                                                                                                    |
| (C.20)  | P0 = H2 V (G3 + T3G4') V                                                                                                                                                                                                            |
|         | ((T4' + G4'H3')Cin(2,4) + T4Cin(2,4)') V                                                                                                                                                                                            |
|         | H5 V (G6 + T6G7') V                                                                                                                                                                                                                 |
|         | ((T7' + G7'H6')Cin(5,7) + T7Cin(5,7)') V                                                                                                                                                                                            |
|         | ((H8'T9 + H8T9')y' + H0y) V                                                                                                                                                                                                         |
|         | (H9'Cin(8,9)y' + (T1Cin(0,1)' +                                                                                                                                                                                                     |
|         | G1'Cin(0,1))y)                                                                                                                                                                                                                      |
| (B.16) => | P(0,1) = H0 V (T1Cin(0,1)' + G1'Cin(0,1))                                                                                                                                                                                         |
| (B.14) => | P(2,4) = H2 V (G3 + T3G4') V                                                                                                                                                                                                      |
|         | ((T4' + G4'H3')Cin(2,4) + T4Cin(2,4)')                                                                                                                                                                                              |
| (B.14) => | P(5,7) = H5 V (G6 + T6G7') V                                                                                                                                                                                                      |
|         | ((T7' + G7'H6)Cin(5,7) + T7Cin(5,7)')                                                                                                                                                                                               |
| (B.16) => | P(8,9) = H8 V (T9Cin(8,9)' + G9'Cin(8,9))                                                                                                                                                                                         |
| (C.21)  | P0 = H2 V (G3 + T3G4') V                                                                                                                                                                                                            |
|         | ((T4' + G4'H3')Cin(2,4) + T4Cin(2,4)') V                                                                                                                                                                                            |
|         | H5 V (G6 + T6G7') V                                                                                                                                                                                                                 |
|         | ((T7' + G7'H6')Cin(5,7) + T7Cin(5,7)') V                                                                                                                                                                                            |
|         | H0y + H8y') V (T1Cin(0,1)' + G1'Cin(0,1))y V                                                                                                                                                                                        |
|         | (T9Cin(8,9)' + G9'Cin(8,9))y'                                                                                                                                                                                                       |

APPENDIX D

For the parity of byte 0 we have i=0 and:

| (3) => | P0 = yP(0,1) V P(2,7) V y'P(8,9) => |
|--------|-------------------------------------|
| (D.1)  | P0 = yP(0,1) V P(2,5) V P(6,7) V y'P(8,9) |

By substituting B.13 or B.16 for P(0,1), P(6,7), P(8,9) and using the following formulas (taken from Langdon and Tang, page 12):

| (D.2) P(i,i+3) = | Hi V T(i+1) V T(i+2) V T(i+3) V |
|------------------|---------------------------------|
|                  | (H(i+1)G(i+2) + H(i+1)'H(i+2)G(i+3)) V |
|                  | (H(i+3)'Cin(i,i+3) + H(i+1)'H(i+2) |
|                  | Cin(i,i+3)) |

Several formulas can be derived for parity prediction. For instance, using B.13 and B.15, the following formulas are derived:

P(0,1) = H0 V T1 V H1'Cin(0,1)
P(6,7) = H6 V T7 V H7'Cin(6,7)
P(8,9) = H8 V T9 V H9'Cin(8,9)
P(2,5) = H2 V T3 V T4 V T5 V (H3G4 +
    H3'H4G5) V
    (H5'Cin(2,5) + H3'H4Cin(2,5))

Thus:
(D.3)   P0 = yH0 V yT1 V yH1'Cin(0,1) V H2 V T3
    V T4 V T5 V
    (H3G4 + H3'H4G5) V (H5'Cin(2,5) +
    H3'H4Cin(2,5)) V
    H6 V T7 V H7'Cin(6,7) V y'H8 V y'T9
    V y'H9'Cin(8,9)

Using the same equivalencies as in the last section:

(D.3) =>
(D.4)   P0 = (yT1 + y'H8) V (yH0 + y'T9) V
    (yH1'Cin(0,1) + y'H9'Cin(8,9)) V H2 V
    T3 V T4 V T5 V
    (H3G4 + H3'H4G5) V H6 V T7 V
    (H5'Cin(2,5) + H3'H4Cin(2,5)) V

-continued

H7'Cin(6,7)

APPENDIX E

By substituting equations B.11, B.12 and B.15 into equation D.1 eight formulas for parity of byte S0 of the result are formed. These formulas can be applied for the prediction of parity of all bytes of the results.

CASE 1
(E.1.0) PO = (H0 V T1 V H1'Cin(0,1)) y V
H2 V T3 V T4 V T5 V (H3G4 + H3'H4G5) V
(H5'Cin)2,5) + H3'H4Cin(2,5)) V H6 V T7 V
H7'Cin(6,7) V (H8 V T9 V H9'Cin(8,9)y'

CASE 1.1
(E.1.1) PO = (yH0 + y'H8) V (yT1 + y'T9)V
(yH1'Cin(0,1) + y'H9'Cin(8,9)) V
H2 V T3 V T4 V T5 V (H3G4 + H3'H4G5) V
(H5'Cin(2,5) + H3'H4Cin(2,5))
V H6 V T7 V H7'Cin(6,7)

CASE 1.2
(E.1.2) PO = (yH0 + y'T9) V (yT1 + y'H8) V
(yH1'Cin(0,1) + y'H9'Cin(8,9)) V
H2 V T3 V T4 V T5 V (H3G4 + H3'H4G5) V
(H5'Cin(2,5) + H3'H4Cin(2,5))
V H6 V T7 V H7'Cin(6,7)

CASE 2
(E.2.0) PO = (H0 V T1 V H1'Cin(0,1))y V H2 V
T3 V T4 V T5 V (H3G4 + H3'H4G5) V
(H5'Cin(2,5) + H3'H4Cin(6,7) V
(H8 V (T9Cin'(8,9) V G9'Cin(8,9)))y'

CASE 2.1
(E.2.1) PO = (yH0 + y'H8) V (yT1 + y'(T9Cin(8,9)' +
G9'Cin(8,9))) V
yH1'Cin(0,1) V H2 V T3 V T4 V T5 V
(H3G4 + H3'H4G5) V
(H5'Cin(2,5) + H3'H4Cin(2,5))
V H6 V T7 V H7'Cin(6,7)

CASE 2.2
(E.2.2) PO = (yH0 +y'(T9Cin(8,9)' + G9'Cin(8,9)))
V (yT1 + y'H8) V
yH1'Cin(0,1) V H2 V T3 V T4 V T5 V
(H3G4 + H3'H4G5) V
(H5'CinT1 + y'H8) V
yH1'Cin(0,1) V H2 V T3 V T4 V T5 V
(H3G4 + H3'H4G5) V
(H5'Cin(2,5) + H3'H4Cin(2,5))
V H6 V T7 V H7'Cin(6,7)

CASE 3
(E.3.0) PO = (H0 V T1 V H1'Cin(0,1)y V H2 V
T3 V T4 V T5 V (H3G4 + H3'H4G5) V
(H5'Cin(2,5) + H3'H4Cin(2,5)) V H6 V
T7Cin(6,7)' + G7'Cin(6,7)) V

CASE 3.2
(E.3.2) PO = (yH0 + y'T9) V (yT1 + y'H8) V
(yH1'*c Cin(0,1) + y'H9'Cin(8,9)) V
H2 V T3 V T4 V T5 V (H3G4 + H3'H4G5) V
(H5'Cin(2,5) + H3'H4Cin(2,5)) V H6 V
(T7Cin(6,7)' + G7'Cin(6,7))

CASE 4
(E.4.0) PO = (H0 V T1 V H1'Cin(0,1))y V H2 V
T3 V T4 V T5 V (H3G4 + H3'H4G5) V
(H5'Cin(2,5) + H3'H4Cin(2,5)) V H6 V
(T7Cin(6,7)' + G7'Cin(6,7)) V
(H8 V (T9Cin'(8,9) V G9'Cin(8,9)))y'

CASE 4.1
(E.4.1) PO = (yH0 + y'H8) V (yT1 +y'(T9Cin(8,9)' +
G9'Cin(8,9))) V
yH1'Cin(0,1) V H2 V T3 V T4 V T5 V
(H3G4 + H3'H4G5) V
(H5'Cin(2,5) + H3'H4Cin(2,5)) V H6 V
(T7Cin(6,7)' + G7'Cin(6,7))

CASE 4.2
(E.4.2) PO = (yH0 + y'(T9Cin(8,9)' + G9'Cin(8,9)))
V (yT1 + y'H8) V
yH1'Cin(0,1) V H2 V T3 V T4 V T5 V

-continued (H3G4 + H3'H4G5) V
(H5'Cin(2,5) + H3'H4Cin(2,5)) V H6 V
(T7Cin(6,7)' + G7'Cin(6,7))

CASE 5
(E.5.0) PO = (H0 V (T1Cin(0,1)' + G1'Cin(0,1))y V
H2 V T3 V T4 V T5 V (H3G4 + H3'H4G5) V
(H5'Cin(2,5) + H3'H4Cin(2,5)) V H6 V
T7 V H7'Cin(6,7) V (H8 V T9 V
H9'Cin(8,9))y'

CASE 5.1
(E.5.1) PO = (yH0 + y'H8) V (y(T1Cin(0,1)' +
G1'Cin(0,1)) + y'T9) V
y'H9'Cin(8,9) V H2 V T3 V T4 V T5 V
(H3G4 + H3'H4G5) V
(H5'Cin(2,5) + H3'H4Cin(2,5)) V H6 V
T7 V H7'Cin(6,7)

CASE 5.2
(E.5.2) PO = (yH0 + y'T9) V (y(T1Cin(0,1)' +
G1'Cin(0,1)) + y'H8) V
y'H9'Cin(8,9) V H2 V T3 V T4 V T5 V
(H3G4 + H3'H4G5) V
(H5'Cin(2,5) + H3'H4Cin(2,5)) V H6 V
T7 V H7'Cin(6,7)

CASE 6
(E.6.0) PO = (H0 V (T1Cin(0,1)' + G1'Cin(0,1))y V
H2 V T3 V T4 V T5 V (H3G4 + H3'H4G5) V
(H5'Cin(2,5) + H3'H4Cin(2,5)) V H6 V
T7 V H7'Cin(6,7) V
(H8 V (T9Cin(8,9)' V G9'Cin(8,9)))y'

CASE 6.1
(E.6.1) PO = (yH0 + y'H8) V H2 V T3 V T4 V T5 V
(y(T1Cin(0,1)' + G1'Cin(0,1))
+ y'(T9Cin(8,9)' + G9'Cin(8,9))) V
(H3G4 + H3'H4G5) V (H5'Cin(2,5) +
H3'H4Cin(2,5)) V
H6 V T7 V H7'Cin(6,7)

CASE 6.2
(E.6.2) PO = (yH0 + y'(T9Cin(8,9)' + G9'Cin(8,9))) V
(y(T1Cin(0,1)' + G1'Cin(0,1)) + y'H8) V
H2 V T3 V T4 V T5 V (H3G4 + H3'H4G5) V
(H5'Cin(2,5) + H3'H4Cin(2,5)) V H6 V
T7 V H7'Cin(6,7)

CASE 7
(E.7.0) PO = (H0 V (T1Cin(0,1)' + G1'Cin(0,1))y V H2 V
T3 V T4 V T5 V (H3G4 + H3'H4G5) V
(H5'Cin(2,5) + H3'H4Cin(2,5)) V H6 V
(T7Cin(6,7)' + G7'Cin(6,7)) V
(H8 V T9 V H9'Cin(8,9))y'

CASE 7.1
(E.7.1) PO = (yH0 + y'H8) V (y(T1Cin(0,1)' +
(G1'Cin(0,1)) + y'T9) V
y'H9'Cin(8,9) V H2 V T3 V T4 V T5 V
(H3G4 + H3'H4G5) V
(H5'Cin(2,5) + H3'H4Cin(2,5)) V H6 V
(T7Cin(6,7)' + G7'Cin(6,7))

CASE 7.2
(E.7.2) PO = (y(T1Cin(0,1)' + G1'Cin(0,1)) + y'H8)
V (yH0 + y'T9) V
y'H9'Cin(8,9) V H2 V T3 V T4 V T5 V
(H3G4 + H3'H4G5) V
(H5'Cin(2,5) + H3'H4Cin(2,5)) V H6 V
(T7Cin(6,7)' + G7'Cin(6,7))

CASE 8
(E.8.0) PO = (H0 V (T1Cin(0,1)' + G1'Cin(0,1))y V H2 V
T3 V T4 V T5 V (H3G4 + H3'H4G5) V
(H5'Cin(2,5) + H3'H4Cin(2,5)) V H6 V
(T7Cin(6,7)' + G7'Cin(6,7)) V
(H8 V (T9Cin(8,9)' V G9'Cin(8,9)))y'

CASE 8.1
(E.8.1) PO = (yH0 + y'H8) V H2 V T3 V T4 V T5 V
(y(T1Cin(0,1)' + G1'Cin(0,1))
+ y'(T9Cin(8,9)' + G9'Cin(8,9))) V
(H3G4 + H3'H4G5) V (H5'Cin(2,5) +
H3'H4Cin(2,5)) V
H6 V (T7Cin(6,7)' + G7'Cin(6,7))

CASE 8.2
(E.8.2) PO = (yH0 + y'(T9Cin(8,9)' + G9'Cin(8,9))) V
(y(T1Cin(0,1)' + G1'Cin(0,1)) + y'H8) V
H2 V T3 V T4 V T5 V (H3G4 + H3'H4G5) V

-continued (H5'Cin(2,5) + H3'H4Cin(2,5)) V H6 V
(T7Cin(6,7)' + G7'Cin(6,7))

APPENDIX F

This appendix describes the implementation of an existing schema for 32-bit adder parity predict (1) and the schema proposed for 34-bit adder parity predict. The CMOS technology chosen allows up to 9-way NANDs (3.9 ns, 6 cells), ANDs (3.8 ns, 6 cells), NORs (4.0 ns, 6 cells), ORs (4.2 ns, 6 cells); 2×8 AND-ORs (4.3 ns, 9 cells); 3×4 AND-ORs (4.1 ns, 7 cells); 2×4 OR-ANDs (4.0 ns, 5 cells); 2 input XOR (2.6 ns, 3 cells); and 2 input XOR not (3.3 ns, 3 cells). Also 3 input XORs (4.7 ns, 5 cells) are allowed producing parity prediction in five stages of delay, however, they are not used because this circuit has a prohibitive delay (an equivalent implementation using two levels of 2 input XORs is slightly faster).

The existing schema for a 32-bit adder parity predict has been implemented in the chosen technology. Shown below is a table which gives the terms that are calculated per each level.

---
32-Bit Adder Parity Predict
---

Level 0
$A_i, B_i, A_i', B_i'$
Level 1
$H_i, H_i', T_i, T_i', G_i, G_i', T(i,i+1), T(i,i+1)',$
$G(i,i+1), G(i,i+1)', T(i,i+2), T(i,i+2)', T(i,i+3),$
$T(i,i+3)', (G3+T3G4'), G4'h3', G(5,6)'T(5,6)',$
$G(6,7)'T(6,7)'$
Level 2
(H0 V H2), A=(H5 V (G3+T3G4')), (T6G7'+G6'H7+G6G7),
(T4'+G4'H3'), (G(5,7),+T(5,7)), G(5,7)'T(5,7)',
T1G(2,3)T(2,3)', T1G(2,3)G(4,5)'T(4,5)',
T1G(2,3)'G(4,5)'G(6,7)T(6,7)', G1'G(2,3), G1'T(2,3)G(4,5),
G1T(2,3)'T(4,5)G(6,7), G1'T(2,3)T(4,5)'T(6,7), (T6'T7+
T6T7'+G6'G7), G(5,7)',T4G(5,7)', G(2,7), G(2,7)'
Level 3
B1=((H0 V H2) V (T6G7'+G6'H7+G6G7)),
C1=((T4'+G4'H3')(G(5,7)+T(5,7))+T4(G(5,7)'T(5,7)')),
D=(T1G(2,7)'T(2,7)'+G1'(G(2,7)+T(2,7))=
(T1G(2,3)'T(2,3)'+T1G(2,3)'G(4,5)'T(4,5)'+
T1G(2,3)'G(4,5)'G(6,7)'T(6,7)'+G1'G(2,3)+
G1'T(2,3)G(4,5)+G1'T(2,3)T(4,5)G(6,7)+
G1'T(2,3)T(4,5)T(6,7))
B0=((H0 V H2) V (T6'T7+T6T7'+G6'G7)),
C0=(((T4'+G4'H3')')G(5,7)+T4G(5,7)'), D1=(T1G(2,7)'
+G1'G(2,7))
Level 4
(A V B1), (A V B0), (C1 V D1), (C0 V D0)
Level 5
E=((A V B1) V (C1 V D1)), F=((A V B0) V (C0 V D0))
Level 6
P0=(Cin & E)+(Cin'& F)

---

A table is also given for the proposed schema for 34-bit adder parity predict which contains the lowest logic level at which each term can be produced.

---
34-bit Adder Parity Predict
---

Level 0
$A_i, B_i, A_i', B_i'$
Level 1
$H_i, H_i', T_i, T_i', G_i, G_i', T(i,i+1), T(i,i+1)', G(i,i+1),$
$G(i,i+1)', T(i,i+2), T(i,i+2)', T(i,i+3), T(i,i+3)',$
(G3 + T3G4'), (G7' + G8 + T8T9), (G6 + T6G7'),
(G(8,9) + T(8,9)), (G(8,9) + T(8,9))'·G7'H6', -continued ---
34-bit Adder Parity Predict
---

(yT1 + y'H8), (yH0 + y'T9)
Level 2
(H2 V T4), ((G3 + T3G4') V H5), ((G6 + T6G7') V
(yT1 + y'H8)),
((G(5,9) + T(5,9))(H4' + H3)), G(5,9)(H4' − H3),
(T7' + G7'H6')(G(8,9) + T(8,9)), (T7' + G7'H6')G(8,9),
T7G(8,9)'T(8,9)', T7G(8,9)', G(2,9), yH1'G(2,3),
yH1'T(2,3)G(4,5), yH1'T(2.3)T(4,5)G(6,7),
yH1'T(2,5)T(6,7)G(8,9), y'H1'T(2,5)T(6,9), y'H9'
Level 3
J = ((H2 V T4) V ((G3 + T3G4') V H5)),
K = (((G6 + T6G7') V (yT1 + y'H8)) V (yH0 + y'T9)),
L0 = ((T7' + G7'H6')G(8,9) + T7G(8,9)').
L1 = ((T7' + G7'H6')(G(8,9) + T(8,9)) + T7G(8,9)'T(8,9)
M1 = (yH1'G(2,9) + yH1'T(2,9) + y'H9'), M0 = (yH1'G(2,9))
Level 4
(J V K), (L0 V L0), (L1 V M1)
Level 5
E = ((J V K) V (L1 V M1)), F = ((J V K) V (L0 V M0))
Level 6
P0 = (Cin & E) + (Cin' & F)

---

APPENDIX G

In the addition of 34 bits with the selection of the 32 most or least significant bits where the final result depends on the instruction, the parity for the 32-bit sum as stated in equation (1) is:

$$Pi = yP(m,m+7) + y'P(n,n+7) \quad (1)$$

where
i belongs to N, m=8i, n=m+2, and $0 \leq i \leq 3$, y being the variable that denotes the selection, Pi being the parity of the byte position i, and
P(a,b) is the parity of sum bits a to b.

$$
\begin{aligned}
(1) \rightarrow Pi &= yP(m,m+7) \vee y'P(n,n+7) \\
&= yP(m,n-1) \vee yP(n,m+7) \vee y'P(n,m+7) \vee y'P(m+8,n+7) \\
&= yP(m,n-1) \vee y'P(m+8,n+7) \vee P(n,m+7) \\
&= yP(m,m+1) \vee y'P(m+8,m+9) \vee P(m+2,m-7)
\end{aligned}
$$

and for the ODD parity:

$$Pi' = (yP(m,m+1))' \vee y'P(m+8,m+9) \vee P(m+2,m+7)$$

For byte 0, i=0, m=0 and $$P0' = (yP(0,1))' \vee y'P(8,9) \vee P(2,7) \quad (G.1)$$

Using the parity predict for two bit groups as stated in (A.3) and letting Cini mean the carry into bit i, we have:

$$
\begin{aligned}
(yP(0,1))' &= (y(T1 \vee H0 \vee H1'Cin1))' \\
&= (yT1 \vee yH0 \vee yH1'Cin1)' \\
&= (y' + T1') \vee yH0 \vee yH1'Cin1
\end{aligned}
$$

and
$$y'P(8,9) = y'T9 \vee y'H8 \vee y'H9'Cin9$$

Thus
$$
\begin{aligned}
(G.2)\ (yP(0,1))' \vee y'P(8,9) = & (y' + T1') \vee \\
& y'T9 \vee yH0 \vee y'H8 \\
& \vee yH1'Cin1 \vee \\
& y'H9'Cin9
\end{aligned}
$$

Let
(a) = $(y' + T1') \vee y'T9 = y'T9' + T1'T9' + yT1'$
and
(b) = $yH0 \vee y'H8 = yH0 + y'H8$ -continued (G.2) →
(G.3) $(yP(0,1))' \lor y'P(8,9) =$ $(yH0 + y'H8) \lor$
$(y'T9' + T1'T9' +$
$yT1') \lor yH1'Cin1 \lor$
$y'H9'Cin9$ Let
$K = (a) \lor (b)$ $= (y'T9' + T1'T9' + yT1')(H0' + y')$
$(H8' + y) + (y + T9)(T1 + T9)(y' + T1)$
$(yH0 + y'H8)$
$= (y'T9' + T1'T9' + yT1')(H0'H8' + yH0' +$
$y'H8') +$
$(yT1 + T9)(y' + T1)(yH0 + y'H8)$
$= y'T9'H8' + T1'T9'H0'H8' + yT1'H0' +$
$(yT1 + y'T9 + T1T9)(yH0 + y'H8)$
(G.3.a) $K$ $= y'T9'T8' + T1'T9'H0'H8' + yT1'H0' +$
$y'T9H8 + yT1H0$ Thus
(G.3) → $(yP(0,1))' \lor y'P(8,9) = K \lor yH1'Cin1 \lor y'H9'Cin9$ Using the three bit group parity as stated in B.18 we have for P(2,7) the following.

$P(2,7) = P(2,4) \lor P(5,7)$
$= H5 \lor T7 \lor (G6 + T6G7') \lor Cin7(H6 +$
$H7') \lor H2 \lor T4 \lor (G3 + T3G4') \lor$
$Cin4(H3 + H4')$
(G.4) $P(2,7) = H5 \lor T7 \lor (G6 + T6G7')' \lor Cin7$
$(H6 + H7') \lor H2 \lor T4 \lor (G3 +$
$T3G4')' \lor Cin4(H3 + H4')$ but
$T7 \lor (G6 + T6G7')' = T7'(T6' + G6'G7) + T7(G6 +$
$T6G7')$
$= T6'T7' + T7G6 + T6H7$ and
$T4 \lor (G3 + T3G4')' = T3'T4' + T4G3 + T3H4$
Thus
(G.4) → $P(2,7) = H2 \lor H5 \lor (T6'T7' + T7G6 + T6H7)$
$\lor (T3'T4' + T4G3 + T3H4) \lor$
$Cin7(H6 + H7') \lor Cin4(H3 + H4')$ and
(G.5) $P0 = K \lor H2 \lor H5 \lor (T6'T7' + T7G6 + T6H7)$
$\lor (T3'T4' + T4G3 + T3H4) \lor yH1'H1'Cin1 \lor$
$y'H9'Cin9$
$\lor Cin7(H6 + H7') \lor Cin4(H3 + H4')$ but
$M = Cin7(H6 + H7') \lor (T6'T7' + T7G6 + T6H7) =$
$(Cin7' + H6'H7') (T6'T7' + T7G6 + T6H7) +$
$Cin7(H6 + H7') (T6 + T7) (T7' + G6')$
$(T6' + H7')$
$= (T6'T7' + T7G6 + T6H7) Cin7' + H7G6 +$
$Cin7(H6 + H7') (T6T7' + T6G6' + T7G6')$
$(T6' + H7')$
$= (T6'T7' + T7G6 + T6H7)Cin7' + H7G6 +$
$Cin7H7'(T6'T7' + T6G6' + T7G6')$
$= (T6'T7' + T7G6 + T6H7)Cin7' + H7G6 +$
$Cin7(T6T7' + T6G6'T7' + T6G6'G7 +$
$G7G6')$
$= (T6'T7' + T7G6 + T6H7)Cin7' + H7G6 +$
$Cin7(G6'G7 + T6T7')$
$= (T6'T7' + T7G6 + T6H7) (T(8,9)'G(8,9)' +$
$G(8,9)'Cin9') + H7G6 + (G(8,9) +$
$T(8,9)Cin9) (G6'G7 + T6T7')$ thus
$P0 = K \lor H2 \lor H5 \lor (T3'T4' + T4G3 + T3H4) \lor M$
$\lor yH1'Cin1 \lor y'H9'Cin9 \lor Cin4(H3 + H4')$ but
$Cin1 = G(2,9) + T(2,9)Cin9$
and
$Cin4 = G(5,9) + T(5,9)Cin9$
thus
(G.5) →
(G.6) $P0 = K \lor H2 \lor H5 \lor (T3'T4' + T4G3 + T3H4) \lor M$
$\lor yH1'(G(2,9) + T(2,9)Cin9)$
$\lor y'H9'Cin9 \lor (G(5,9) + T(5,9)Cin9)$
$(H3 + H4')$ For Cin9 = 1
(G.5.a) $M(C=1) = T6'T7'W' + T7G6W' + T6H7W' + H7G6 +$
$WG6'G7 + WT6T7'$
where
$W = (G(8,9) + T(8,9))$ $= G8 + T8G9 + T8T9$
$= G8 + T8T9$ and
$W' = (G(8,9) + T(8,9))'$
$= G(8,9)'T(8,9)'$
$= T8' + G8'T9'$ then
(G.6) →
(G.7) $P0(C=1) = K \lor H2 \lor H5 \lor (T3'T4' + T4G3 + T3H4)$
$\lor M(C=1)$
$\lor yH1'(G(2,9) + T(2,9)) \lor y'H9'$
$\lor (G(5,9) + T(5,9)) (H3 + H4')$ And for Cin9 = 0
(G.7.a) $M(C=0) = T6T7'G(8,9)' + T7G6G(8,9)' + T6H7G(8,9)'$
$H7G6 + G(8,9)G6'G7 + G(8,9)T6T7'$ then
(G.6) →
(G.8) $P0(C=0) = K \lor H2 \lor H5 \lor (T3'T4' + T4G3 +$
$T3H4$
$\lor M(C=0) \lor yH1'G(2,9) \lor G(5,9)$
$(H3 + H4')$ Thus, the parity for byte 0 is:

$$P0 = P0(C=1)Cin9 + P0(C=0)Cin9' \quad (G.9)$$

It can be observed that equation (G.9) can be produced by a 2×2 AND-OR array (AO) or equivalent array and that actual technologies provide arrays with an equal to or higher level of function. Thus, if a technology offers a 3×4 AO or equivalent array, instead of computing P0(C=1) and P0(C=0), it is possible to break those paths in two because P0(C=1) and P0(C=0) can be written as follows:

$P0(C=1) = Pa0 \lor Pb0$
and
$P0(C=0) = Pc0 \lor Pd0$
where
(G.9.a) $Pa0 = K \lor H2 \lor H5 \lor y'H9' \lor M(C=1)$
(G.9.b) $Pb0 = (T3'T4' + T4G3 + T3H4) \lor yH1'(G(2,9) +$
$T(2,9))$
$\lor (G(5,9) + T(5,9))(H3 + H4')$
(G.9.c) $Pc = K \lor H2 \lor H5 \lor M(C=0)$
(G.9.d) $Pd = (T3'T4' + T4G3 + T3H4) \lor yH1'G(2,9) \lor$
$G(5,9) (H3 + H4')$
then
(G.9) →
(G.10) $P0 = (Pa0 \lor Pb0)Cin9 + (Pc0 \lor Pd0) Cin9'$
$= Pa0'Pb0Cin9 + Pa0Pb0'Cin9 + Pc0'Pd0Cin9' +$
$Pc0Pd0'Cin9'$
And the even parity for S0 is:
$Pe0 = P0' = (P0(C=1)Cin9 + P0(C=0)Cin9')'$
$= (P0(C=1)' + Cin9') (P0(C=0)' +$
$Cin9)$
(G.11) $Pe0 = P0(C=1)'P0(C=0)' + P0(C=1)'Cin9 +$
$P0(C=0)'Cin9'$
If A, B, and C are Boolean, then $AC + AB + B'C = AB + B'C$
Thus
(G.12) →$Pe0 = P0(C=1)'Cin9 + P0(C=0)'Cin9'$
$= (Pa0 \lor Pb0)'Cin9 + (Pc0 \lor Pd0)'Cin9'$
$= Pa0'Pb0Cin9 + Pa0Pb0Cin9 + Pc0'Pd0'Cin9' +$
$Pc0Pd0Cin9'$

We claim:
1. A parity prediction system for a binary adder unit which receives and combines a pair of multi-bit data operands to produce a multi-bit result, said parity prediction system comprising:
selection signal means for producing a selection signal indicating selected bits of said result, said selected bits including fewer than all of the bits of said result;

selection means connected to said adder unit and to said selection signal means for providing said selected bits in response to said selection signal, said selected bits representing a sum of said operands; and parity prediction means connected to said adder unit and to said selection signal means for predicting the parity of said selected bits in response to said operands and said selection signal and for providing a predicted parity signal representing said parity.

2. The parity prediction system of claim 1, further comprising:

parity generating means connected to said selection means for providing a generated parity signal in response to said selected bits, said generated parity signal representing the parity of said selected bits; and parity comparison means for comparing said generated parity signal with said predicted parity signal to provide an error signal when said generated parity signal and said predicted parity signal do not match.

3. The parity prediction system of claim 1 wherein said predicted parity signal includes one parity bit for each 8 bits of said selected bits.

4. A data processing system including a binary adder for receiving and combining two multi-bit, binary operands, A and B, to produce a binary result including n result bits in predetermined magnitude order, said data processing system comprising:

selection signal generating means for producing a selection signal indicating selection of result bits, said selection signal having a first value, y, or a second value, y';

selection means connected to said adder and to said selection signal generating means for providing selected result bits as a select signal representing a sum of A and B, said select signal including the n-k most significant result bits in response to y, and the n-k least significant result bits in response to y', where n and k are integers and n>k; and parity prediction means for providing one parity bit for each l bits of said select signal, where l is an integer greater than k and less than n, said parity bit determined in response to m bits of said select signal, where m is equal to l+k, 0 being the most significant bit of said m bits and m−1 being the least significant bit of said m bits, said parity bit being generated by logic circuitry executing the relationship:

$P(0,m-1) = yP(0,k-1) \vee P(k,m-k-1) \vee y'P(m-k,m-1)$ where, adjacent terms indicate the logical AND of these terms, V indicates the Exclusive-OR operation, and P(x,y) indicates the parity of bits x through y.

5. The data processing system of claim 4 where l is equal to eight.

6. The data processing system of claim 4 where k is equal to two.

7. A data processing system including a binary adder for adding two binary operands, A and B, each of said operands including a plurality of operand bits representing the magnitude of a number represented by said operand, said adder providing a plurality of result bits in a magnitude order and representing the result of addition of said binary operands, said data processing system comprising:

selection signal means for providing a binary selection signal having a first value, y, or a complementary value, y';

selection means, connected to said adder and to said selection signal means and including an output port, for providing selected result bits at said output port in response to said selection signal, said selected result bits including fewer than all of said result bits, and said selected result bits including the most significant result bits in response to y and the least significant result bits in response to y'; and parity prediction means connected to said adder and to said selection signal means for providing one parity bit for each eight selected result bits, the parity bit for the most significant eight bits of said selected result bits determined by logic gates executing the formula:

$$\begin{aligned} P0 = &\ (yT1+y'H8) \vee (yH0+y'T9) \vee \\ &\ (yH1'(G(2,9)+T(2,9)Cin)+y'H9'Cin) \vee \\ &\ H2 \vee T4 \vee H5 \vee \\ &\ (G3+T3G4') \vee (H4'+H3)(G(5,9)+ \\ &\ T(5,9)Cin) \vee \\ &\ (G6+T6G7') \vee \\ &\ ((T7'+G7'H6')(G(8,9)+T(8,9)Cin) + \\ &\ T7(G(8,9)+T(8,9)Cin)') \end{aligned}$$

where

+ is the logical OR operation, adjacent terms indicate the logical AND of these terms, V is the EXCLUSIVE-OR operation, Cin is a byte carry bit into the said most significant eight bits, $T(i) = A(i) + B(i)$, $G(i) = A(i)B(i)$, $H(i) = A(i) \vee B(i)$ A(i) is the ith bit of operand A and B(i) is the ith bit of operand B, i is an integer, and 0 is the most significant bit position of said result and bit position i of said result is less significant than bit position i−1, and more significant than bit position i+1.

8. The data processing system of claim 7, wherein said result bits include 34 bits and said selected result bits include 32 bits.

9. A data processing system including an adder for adding two binary operands, A and B, each of said operands including a plurality of operand bits representing the magnitude of a number represented by said operands, each of said operand bits occupying a bit position i, where i is a positive integer and i≧0, the significance of said operand bits being inversely related to their bit positions, said adder producing a plurality of result bits in magnitude order and representing the result of addition of said binary data operands, said data processing system comprising:

selection signal means for providing a binary selection signal having a first value, y, or a complementary value, y';

selection means, connected to said adder and to said selection signal means and including an output port, for providing selected result bits on said output port in response to said selection signal, said selected result bits including fewer than all of said result bits, and said selected result bits including the most significant result bits in response to y and the least significant result bits in response to y'; and parity prediction means connected to said adder and to said selection signal means for providing one parity bit for each eight selected result bits, the parity bit for the most significant eight bits of said selected result bits determined by logic gates executing the formula:

```
P0 =  yH0 V yT1 V yH1'Cin(0,1) V H2 V T3
      V T4 V T5 V
      (H3G4+H3'H4G5) V (H5'Cin(2,5)+
      H3'H4Cin(2,5)) V
      H6 V T7 V H7'Cin(6,7) V y'H8 V y'T9
      V Y'H9'Cin(8,9)
``` where
+ is the logical OR operation,
adjacent terms indicate the logical AND of these terms,
V is the EXCLUSIVE-OR operation,
Cin is a nibble carry bit for the said most significant eight bits,
$T(i) = A(i) + B(i)$,
$G(i) = A(i)B(i)$,
$H(i) = A(i) \lor B(i)$
A(i) is the ith bit of operand A and B(i) is the ith bit of operand B,
i is an integer, and
0 is the most significant bit position of said result and bit position i of said result is less significant than bit position i−1, and more significant than bit position i+1.

10. The data processing system of claim 9 wherein said result bits include 34 bits and said selected result bits include 32 bits.

11. A data processing system including an adder for adding two binary operands, A and B, each of said operands including a plurality of operand bits in a magnitude order and representing the magnitude of a number represented by said operand, said adder providing a plurality of result bits in a magnitude order and representing the result of addition of said binary operands, said data processing system comprising:
selection signal means for providing a binary selection signal having a first value, y, or a complementary value, y';
selection means, connected to said adder and to said selection signal means and including an output port, for providing selected result bits on said output port in response to said selection signal, said selected result bits including fewer than all of said result bits, and said selected result bits including the most significant result bits in response to y and the least significant result bits in response to y'; and
parity prediction means connected to said adder and to said selection signal means for providing one parity bit for each eight selected result bits, the parity bit for the most significant eight bits of said selected result bits determined by logic gates executing the formula:

```
P0 =  (yT1+y'H8) V (yH0+y'T9) V
      (yH1'(G(2,9)+T(2,9)Cin)+y'H9'Cin) V
      H2 V T4 V H5 V
```

-continued
```
(G3+T3G4') V (H4'+H3) (G(5,9)+
T(5,9)CIN) V
(G6+T6G7') V
((T7'+G7'H6') (G(8,9)+T(8,9)Cin+
T7(G(8,9)+T(8,9)Cin)')
``` where
+ is the logical OR operation,
adjacent terms indicate the logical AND of these terms
V is the EXCLUSIVE-OR operation,
Cin is a byte carry bit into the said most significant eight bits,
$T(i) = A(i) + B(i)$,
$G(i) = A(i)B(i)$,
$H(i) = A(i) \lor B(i)$
A(i) is the ith bit of operand A and B(i) is the ith bit of operand B,
i is an integer, and
0 is the most significant bit position of said result and bit position i of said result is less significant than bit position i−1, and more significant than bit position i+1.

12. The data processing of claim 11 wherein said result bits include 34 bits and said selected bits include 32 bits.

13. A data processing system including an adder for adding two binary operands, A and B, each of said operands including a plurality of operand bits in a magnitude order and representing the magnitude of a number represented by said operand, said adder providing a plurality of result bits in a magnitude order and representing the result of addition of said binary operands, said data processing system comprising:
selection signal means for providing a binary selection signal having a first value, y, or a complementary value, y';
selection means, connected to said adder and to said selection signal means and including an output port, for providing selected result bits on said output port in response to said selection signal, said selected result bits including fewer than all of said result bits, and said selected result bits including the most significant result bits in response to y and the least significant result bits in response to y'; and
parity prediction means connected to said adder and to said selection signal means for providing one parity bit for each eight selected result bits, the parity bit for the most significant eight bits of said selected result bits determined by logic gates executing the formula:

```
P0 =  K V H2 V H5 V (T6'T7' + T7G6 + T6H7)
      V (T3'T4' + T4G3 + T3H4) V yH1'Cin1 V
      y'H9'Cin9
      V Cin7(H6 + H7') V Cin4(H3 + H4')
``` where
K = y'T9'T8'+T1'T9'H0'H8'+yT1'H0' + y'T9H8 + yT1H0
and, where
+ is the logical OR operation,
adjacent terms indicate the logical AND of these terms,
V is the EXCLUSIVE-OR operation, Cin is a byte carry bit into the said most significant eight bits, $T(i) = A(i) + B(i)$, $G(i) = A(i)B(i)$, $H(i) = A(i) \text{ V } B(i)$ A(i) is the ith bit of operand A and B(i) is the ith bit of operand B, i is an integer, and 0 is the most significant bit position of said result and bit position i of said result is less significant than bit position i−1, and more significant than bit position i+1.

14. The data processing system of claim 13 wherein said result bits include 34 bits and said selected bits include 32 bits.

15. A data processing system including an adder for adding two binary operands, A and B, each of said operands including a plurality of operand bits in a magnitude order and representing the magnitude of a number represented by said operand, said adder providing a plurality of result bits in a magnitude order and representing the result of addition of said binary operands, said data processing system comprising:

selection signal means for providing a binary selection signal having a first value, y, or a complementary value, y';

selection means, connected to said adder and to said selection signal means and including an output port, for providing selected result bits on said output port in response to said selection signal, said selected result bits including fewer than all of said result bits, and said selected result bits including the most significant result bits in response to y and the least significant result bits in response to y'; and parity prediction means connected to said adder and to said selection signal means for providing one parity bit for each eight selected result bits, the parity bit for the most significant eight bits of said selected result bits determined by logic gates executing the formula:

$$PO = K \text{ V } H2 \text{ V } H5 \text{ V } (T3'T4' + T4G3 + T3H4) \text{ V } M$$
$$\text{V } yH1'(G(2,9) + T(2,9)Cin9) \text{ V } y'H9'Cin9 \text{ V }$$
$$(G(5,9) + T(5,9)Cin9)(H3 + H4')$$

where $K = y'T9'T8' + T1'T9'H0'H8' + yT1'H0' + y'9H8 + yT1H0$ and, $M = (T6'T7' + T7G6 + T6H7)(T(8,9)'G(8,9)' + G(8,9)'Cin9') + H7G6 + (G(8,9) + T(8,9)Cin9)(G6'G7 + T6T7')$ where + is the logical OR operation, adjacent terms indicate the logical AND of these terms, V is the EXCLUSIVE-OR operation, Cin is a byte carry bit into the said most significant eight bits, $T(i) = A(i) + B(i)$, $G(i) = A(i)B(i)$, $H(i) = A(i) \text{ V } B(i)$ A(i) is the ith bit of operand A and B(i) is the ith bit of operand B, i is an integer, and 0 is the most significant bit position of said result and bit position i of said result is less significant than bit position i−1, and more significant than bit position i+1.

16. The data processing system of claim 15 wherein said result bits include 34 bits and said selected bits include 32 bits.

17. A data processing system including an adder for adding two binary operands, A and B, each of said operands including a plurality of operand bits in a magnitude order and representing the magnitude of a number represented by said operand, said adder providing a plurality of result bits in a magnitude order and representing the result of addition of said binary operands, said data processing system comprising:

selection signal means for providing a binary selection signal having a first value, y, or a complementary value, y';

selection means, connected to said adder and to said selection signal means and including an output port, for providing selected result bits on said output port in response to said selection signal, said selected result bits including fewer than all of said result bits, and said selected result bits including the most significant result bits in response to y and the least significant result bits in response to y'; and parity prediction means connected to said adder and to said selection signal means for providing one parity bit for each eight selected result bits, the parity bit for the most significant eight bits of said selected result bits determined by logic gates executing the formula:

$$PO = PO(C=1)Cin9 + PO(C=0)Cin9'$$

where $PO(C=1) = K \text{ V } H2 \text{ V } H5 \text{ V } (T3'T4' + T4G3 + T3H4) \text{ V } M(C=1) \text{ V } yH1'(G(2,9) + T(2,9)) \text{ V } y'H9' \text{ V } (G(5,9) + T(5,9))(H3 + H4')$, $PO(C=0) = K \text{ V } H2 \text{ V } H5 \text{ V } (T3'T4' + T4G3 + T3H4) \text{ V } M(C=0) \text{ V } yH1'G(2,9) \text{ V } G(5,9) (H3 + H4')$, $M(C=1) = T6'T7'W' + T7G6W' + T6H7W' + H7G6 + WG6'G7 + WT6T7'$, $W = G8 + T8G9 + T8T9$, $M(C=0) = T6'T7'G(8,9)' + T7G6G(8,9)' + T6H7G(8,9)' \quad H7G6 + G(8,9)G6'G7 + G(8,9)T6T7'$, $K = y'T9'T8' + T1'T9'H0'H8' + yT1'H0' + y'T9H8 + yT1H0$ where + is the logical OR operation, adjacent terms indicate the logical AND of these terms, V is the EXCLUSIVE-OR operation, Cin is a byte carry bit into the said most significant eight bits, $T(i) = A(i) + B(i)$, $G(i) = A(i)B(i)$, $H(i) = A(i) \text{ V } B(i)$ A(i) is the ith bit of operand A and B(i) is the ith bit of operand B, i is an integer, and 0 is the most significant bit position of said result and bit position i of said result is less significant than bit position i−1, and more significant than bit position i+1.

18. The data processing system of claim 17 wherein said result bits include 34 bits and said selected bits include 32 bits.

19. A data processing system including an adder for adding two binary operands, A and B, each of said operands including a plurality of operand bits in a magnitude order and representing the magnitude of a number represented by said operand, said adder providing a plurality of result bits in a magnitude order and representing the result of addition of said binary operands, said data processing system comprising:

selection signal means for providing a binary selection signal having a first value, y, or a complementary value, y';

selection means, connected to said adder and to said selection signal means and including an output port, for providing selected result bits on said output port in response to said selection signal, said selected result bits including fewer than all of said result bits, and said selected result bits including the most significant result bits in response to y and the least significant result bits in response to y'; and parity prediction means connected to said adder and to said selection signal means for providing one parity bit for each eight selected result bits, the parity bit for the most significant eight bits of said selected result bits determined by logic gates executing the formula:

$PO = Pa'PbCin9 + PaPb'Cin9 + Pc'PdCin9' + PcPd'CIN9'$ where
$Pa = K \; V \; H2 \; V \; H5 \; V \; y'H9' \; V \; M(C=1)$,
$Pb = (T3'T4' + T4G3 + T3H4) \; V \; yH1'(G(2,9) + T(2,9)) \; V \; (G(5,9) + T(5,9)) \; (H3 + H4')$,
$Pc = K \; V \; H2 \; V \; H5 \; V \; M(C=0)$,
$Pd = (T3'T4' + T4G3 + T3H4) \; V \; yH1'G(2,9) \; V \; G(5,9) \; (H3 + H4')$,
$M(C=1) = T6'T7'W' + T7G6W' + T6H7W' + H7G6 + WG6'G7 + WT6T7'$
$W = G8 + T8G9 = T8T9$,
$M(C=0) = T6'T7'G(8,9)' + T6H7G(8,9)'H7G6 + G(8,9)T6T7'$,
$K = y'T9'T8' + T1'T9'H0'H8' + yT1'H0' + y'T9H8 + yT1H0$ where
+ is the logical OR operation,
adjacent terms indicate the logical AND of these terms,
V is the EXCLUSIVE-OR operation,
Cini is a carry bit into the said most significant eight bits,
$T(i) = A(i) + B(i)$,
$G(i) = A(i)B(i)$,
$H(i) = A(i) V B(i)$
A(i) is the ith bit of operant A and B(i) is the ith bit of operand B,
i is an integer, and
0 is the most significant bit position of said result and bit position i of said result is less significant than bit position i−1, and more significant than bit position i+1.

20. The data processing system of claim 19 wherein said result bits include 34 bits and said selected bits include 32 bits.

21. The processing system of claim 19 further comprising even parity means for calculating the even parity, Pe, of said most significant 8 bits of said selected result bits, said even parity being determined by logic gates executing the formula:

$Pe = Pa'Pb'Cin9 + PaPbCin9 + Pc'Cin9 + PcPdCin9'$.

* * * * *

UNITED STATES PATENT AND TRADEMARK OFFICE
CERTIFICATE OF CORRECTION

PATENT NO. : 4,924,424

DATED : May 8, 1990

INVENTOR(S) : Vassiliadis et al

It is certified that error appears in the above-identified patent and that said Letters Patent is hereby corrected as shown below:

Col. 33, line 48, please insert --T-- between "y" and "9";

Col. 36, line 4, please insert --T7G6G(8,9)'+-- immediately following the first occurrence of "+", and insert --G(8,9)G6'G7+-- after the last occurrence of "t"; and
line 34, please insert --Pa'-- between "Pc'" and "Cin9"

Signed and Sealed this

Twenty-third Day of July, 1991

Attest:

HARRY F. MANBECK, JR.

*Attesting Officer*     *Commissioner of Patents and Trademarks*